(12) United States Patent
Chang et al.

(10) Patent No.: US 12,160,369 B2
(45) Date of Patent: Dec. 3, 2024

(54) PROCESSOR RELATED COMMUNICATIONS

(71) Applicant: Intel Corporation, Santa Clara, CA (US)

(72) Inventors: Chih-Jen Chang, Union City, CA (US); Daniel Christian Biederman, Saratoga, CA (US); Matthew James Webb, Woodland Hills, CA (US); Wing Cheung, Fremont, CA (US); Jose Niell, Franklin, MA (US); Robert Hathaway, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 16/276,979

(22) Filed: Feb. 15, 2019

(65) Prior Publication Data

US 2019/0207868 A1  Jul. 4, 2019

(51) Int. Cl.
| | |
|---|---|
| *H04L 47/80* | (2022.01) |
| *H04L 41/042* | (2022.01) |
| *H04L 45/00* | (2022.01) |
| *H04L 47/2425* | (2022.01) |
| *H04L 47/2483* | (2022.01) |
| *H04L 47/62* | (2022.01) |

(52) U.S. Cl.
CPC .......... *H04L 47/805* (2013.01); *H04L 41/042* (2013.01); *H04L 45/38* (2013.01); *H04L 47/2433* (2013.01); *H04L 47/2483* (2013.01); *H04L 47/6215* (2013.01); *H04L 2212/00* (2013.01)

(58) Field of Classification Search
CPC ..... H04L 47/805; H04L 41/042; H04L 45/38; H04L 47/2433; H04L 47/2483
See application file for complete search history.

(56) References Cited

U.S. PATENT DOCUMENTS 9,344,377 B2 * 5/2016 Pong ...................... H04L 69/22
10,515,037 B2 12/2019 Pope
(Continued)

OTHER PUBLICATIONS

Extended European Search Report for Patent Application No. 20152538.3, Mailed Jul. 6, 2020, 9 pages.
(Continued)

*Primary Examiner* — Won Tae C Kim
(74) *Attorney, Agent, or Firm* — Compass IP Law PC

(57) ABSTRACT

A compute device can access local or remote accelerator devices for use in processing a received packet. The received packet can be processed by any combination of local accelerator devices and remote accelerator devices. In some cases, the received packet can be encapsulated in an encapsulating packet and sent to a remote accelerator device for processing. The encapsulating packet can indicate a priority level for processing the received packet and its associated processing task. The priority level can override a priority level that would otherwise be assigned to the received packet and its associated processing task. The remote accelerator device can specify a fullness of an input queue to the compute device. Other information can be conveyed by packets transmitted between and among compute devices and remote accelerator devices to assist in determining an accelerator to use or other uses.

20 Claims, 21 Drawing Sheets

(56) References Cited

U.S. PATENT DOCUMENTS

| | | | | |
|---|---|---|---|---|
| 11,275,622 | B2* | 3/2022 | Li | G06F 9/505 |
| 2004/0133763 | A1* | 7/2004 | Mathur | G06F 15/7867 |
| | | | | 712/34 |
| 2012/0099591 | A1 | 4/2012 | Kotha et al. | |
| 2012/0151004 | A1 | 6/2012 | Pope | |
| 2012/0250686 | A1 | 10/2012 | Vincent et al. | |
| 2012/0254587 | A1* | 10/2012 | Biran | G06F 13/4022 |
| | | | | 712/34 |
| 2013/0138758 | A1 | 5/2013 | Cohen et al. | |
| 2014/0105208 | A1 | 4/2014 | Pope et al. | |
| 2015/0019748 | A1 | 1/2015 | Gross, IV et al. | |
| 2015/0161064 | A1 | 6/2015 | Pope | |
| 2015/0169496 | A1 | 6/2015 | Pope | |
| 2015/0186268 | A1 | 7/2015 | Asaad et al. | |
| 2016/0224268 | A1 | 8/2016 | Asaad et al. | |
| 2016/0330112 | A1 | 11/2016 | Raindel et al. | |
| 2016/0364271 | A1* | 12/2016 | Burger | G06F 9/505 |
| 2016/0380896 | A1 | 12/2016 | Caulfield et al. | |
| 2016/0380922 | A1 | 12/2016 | Gross, IV et al. | |
| 2017/0024352 | A1 | 1/2017 | Lavasani | |
| 2017/0250914 | A1 | 8/2017 | Caulfield et al. | |
| 2018/0150423 | A1 | 5/2018 | Pope | |
| 2018/0152317 | A1 | 5/2018 | Chang et al. | |
| 2018/0191629 | A1 | 7/2018 | Biederman et al. | |
| 2019/0042310 | A1 | 2/2019 | Browne et al. | |
| 2019/0044705 | A1* | 2/2019 | Deval | H04L 69/164 |
| 2019/0052583 | A1 | 2/2019 | Jain et al. | |
| 2019/0140979 | A1 | 5/2019 | Levi et al. | |
| 2019/0207868 | A1 | 7/2019 | Chang et al. | |
| 2020/0201797 | A1* | 6/2020 | Vu | H04L 1/0041 |
| 2020/0218684 | A1* | 7/2020 | Sen | G06F 13/4027 |

OTHER PUBLICATIONS

Adrian M. Caulfield et at., "A Cloud-Scale Acceleration Architecture," Microsoft Corporation, retrieved from https://www.microsoft.com/en-us/research/wp-content/uploads/2016/10/Cloud-Scale-Acceleration-Architecture.pdf, 13 pages.

Advisory Action for U.S. Appl. No. 15/721,053, Mailed Nov. 2, 2020, 3 pages.

Final Office Action for U.S. Appl. No. 15/721,053, Mailed Aug. 11, 2020, 18 pages.

Final Office Action for U.S. Appl. No. 15/721,053, Mailed Jul. 15, 2021, 26 pages.

First Office Action for U.S. Appl. No. 15/721,053, Mailed Feb. 10, 2020, 16 pages.

Notice of Allowance for U.S. Appl. No. 15/721,053, Mailed Jan. 12, 2022, 12 pages.

Second Office Action for U.S. Appl. No. 15/721,053, Mailed Jan. 28. 2021, 24 pages.

Caulfield, Adrian, et al., "A Cloud-Scale Acceleration Architecture", Microsoft Corporation, 2016 IEEE, The 49th Annual IEEE/ACM International Symposium on Microarchitecture, Article No. 7, Taipei, Taiwan—Oct. 15-19, 2016, 13 pages.

Tarafdar, Naif, "Building and Using Virtual FPGA Clusters in Data Centers", A thesis submitted in conformity with the requirements for the degree of Masters of Applied Science Graduate Department of Electrical and Computer Engineering University of Toronto, Copyright 2017 by Naif Tarafdar, Jun. 2017, 87 pages.

Tarafdar, Naif, et al., "Enabling Flexible Network FPGA Clusters in a Heterogeneous Cloud Data Center", University of Toronto, Conference Paper, Feb. 2017, 11 pages.

Third Office Action for U.S. Appl. No. 15/721,053, Mailed Jul. 28, 2022, 27 pages.

European First Office Action, (EP Exam Report Article 94(3) EPC), for Patent Application No. 20152538.3, Mailed Jul. 28, 2022, 4 pages.

* cited by examiner

PROCESSOR RELATED COMMUNICATIONS

CROSS-REFERENCE TO RELATED APPLICATION

Related application entitled "TECHNOLOGIES FOR REMOTE ACCELERATOR INTERFACE," inventors Chang et al, filed Sep. 29, 2017, application Ser. No. 15/721,053.

BACKGROUND

Certain computing tasks may be performed more quickly by a hardware accelerator, such as a field programmable gate array (FPGA), application specific integrated circuit (ASIC), or graphics processing unit (GPU), than by a central processing unit. Compute devices are increasingly employing hardware accelerators in order to perform suitable computing tasks more quickly. In many applications, the accelerators may be locally accessible to a central processing unit using a Peripheral Component Interconnect Express (PCIe) or similar connection.

Some solutions limit accelerator functions to a single-pass packet processing in receive or transmit direction. The accelerator functions usually perform pre-processing accelerator functions before a packet reaches the processing elements or post-processing accelerator functions after the processing elements have completed the packet processing.

DETAILED DESCRIPTION

Figure 1:
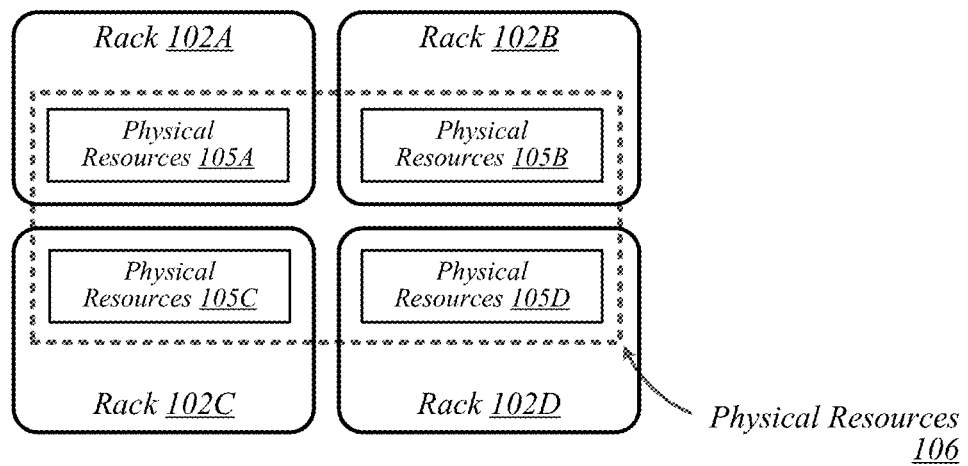
FIG. 1 is a diagram of a conceptual overview of a data center.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
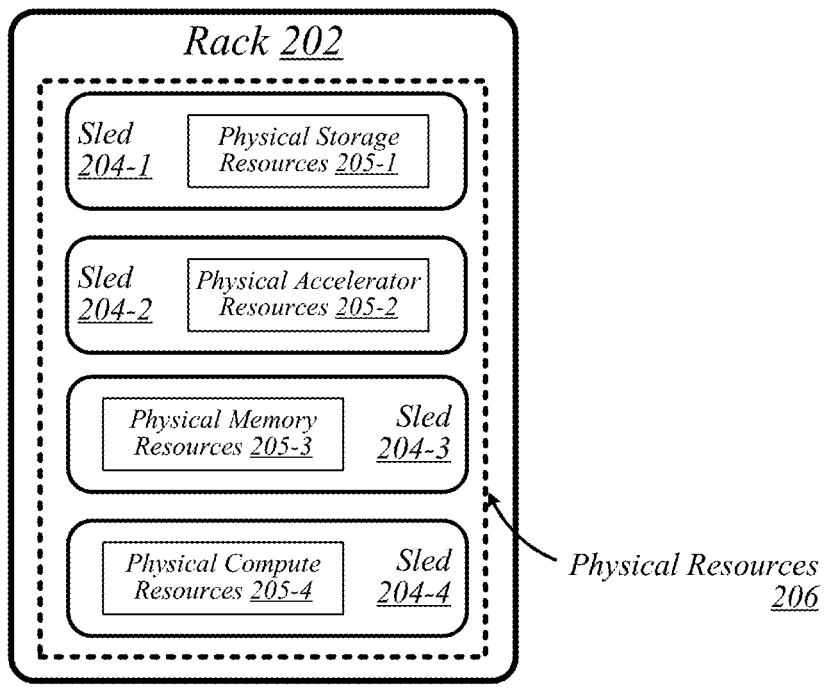
FIG. 2 is a diagram of an example embodiment of a logical configuration of a rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
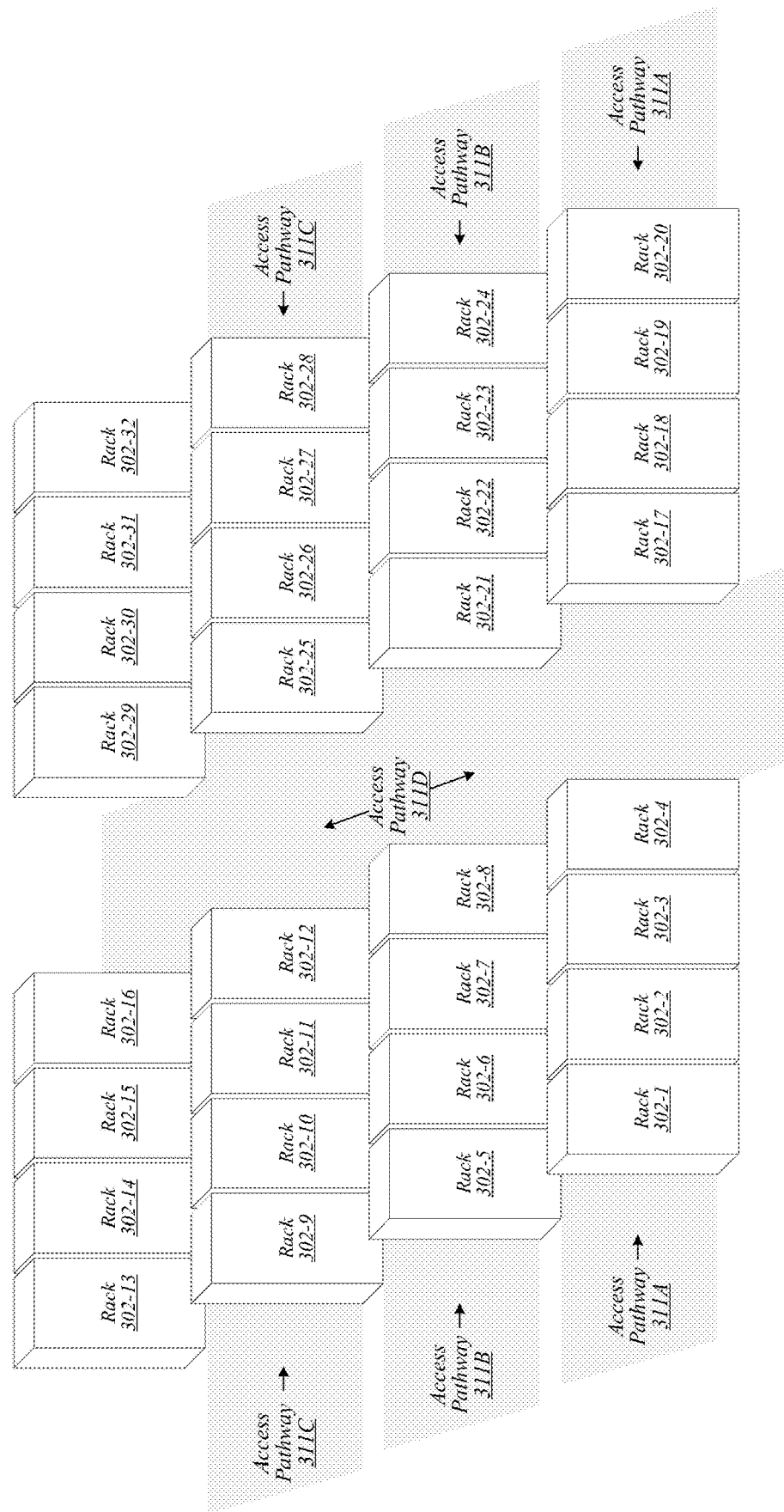
FIG. 3 is a diagram of an example embodiment of another data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
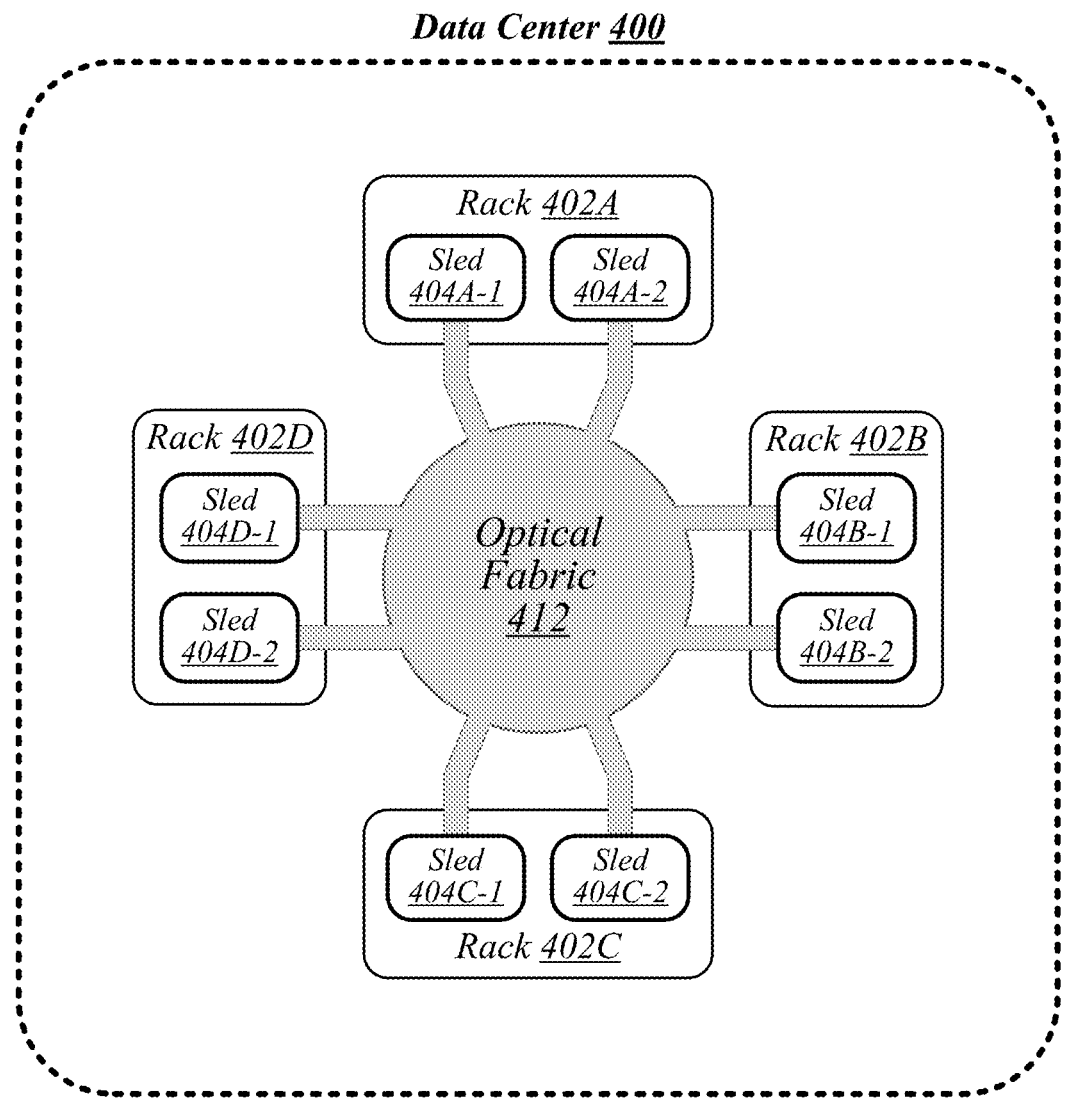
FIG. 4 is a diagram of another example embodiment of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
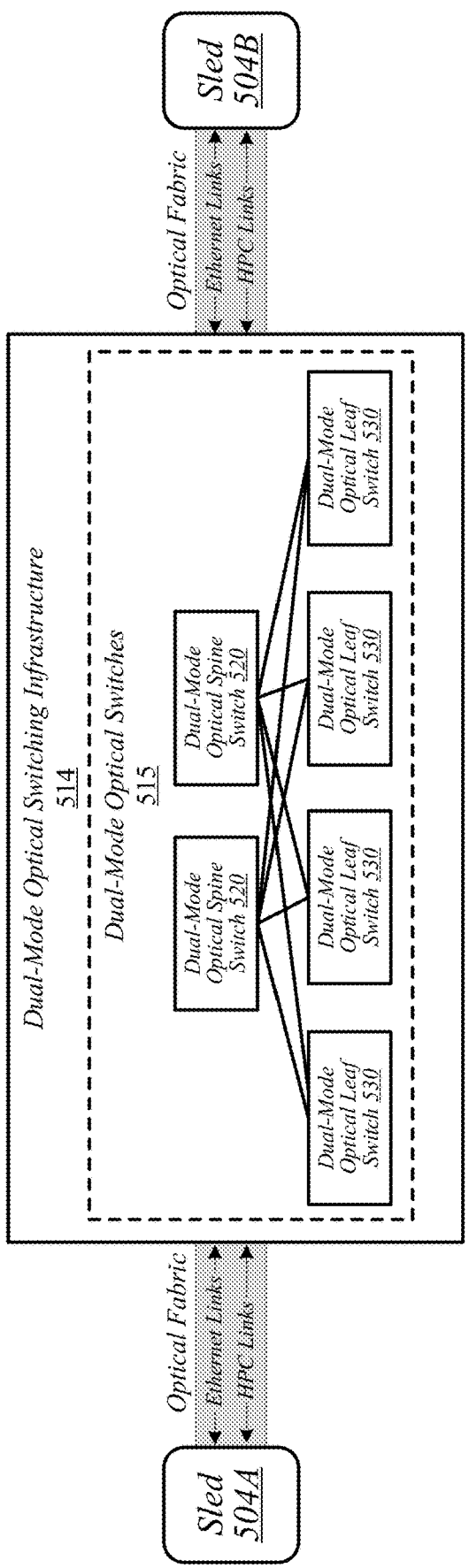
FIG. 5 is a diagram of a connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture, InfiniBand) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
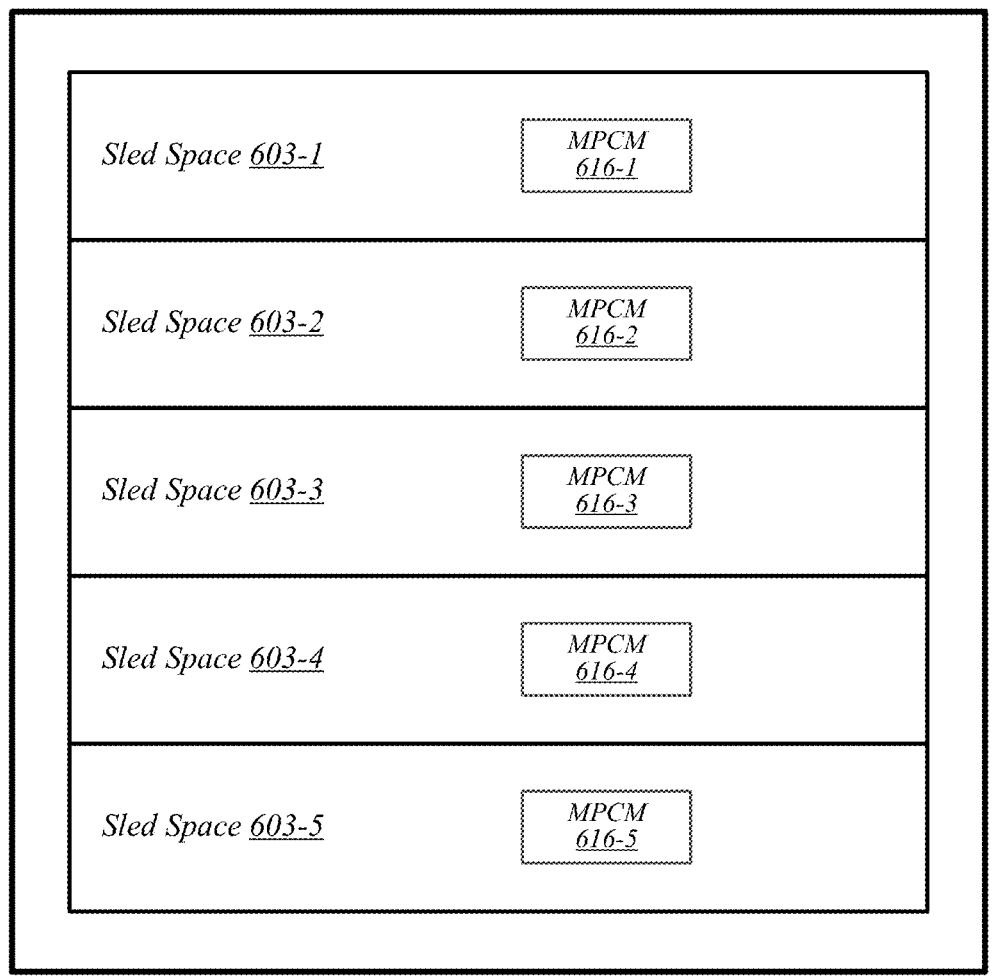
FIG. 6 is a diagram of a rack architecture.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
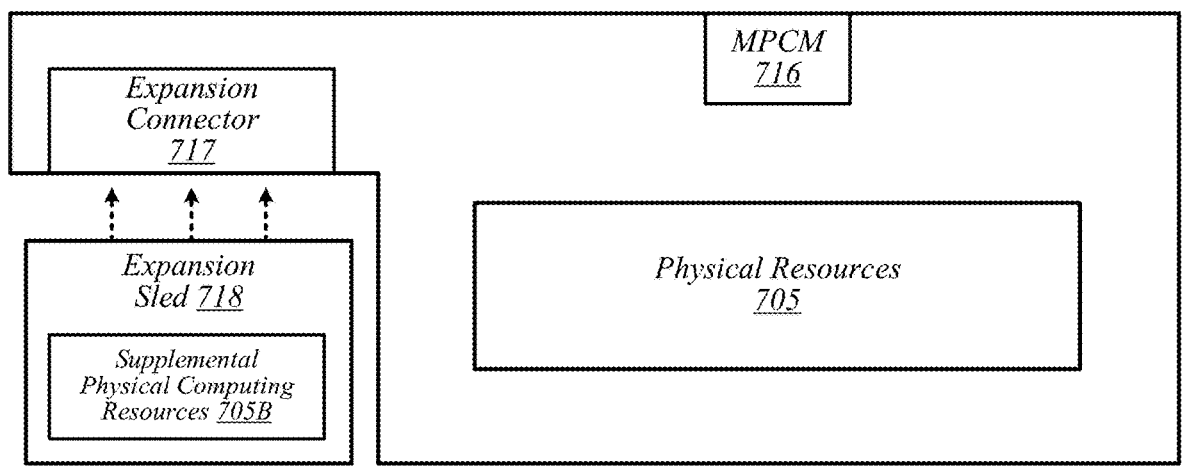
FIG. 7 is a diagram of an example embodiment of a sled.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
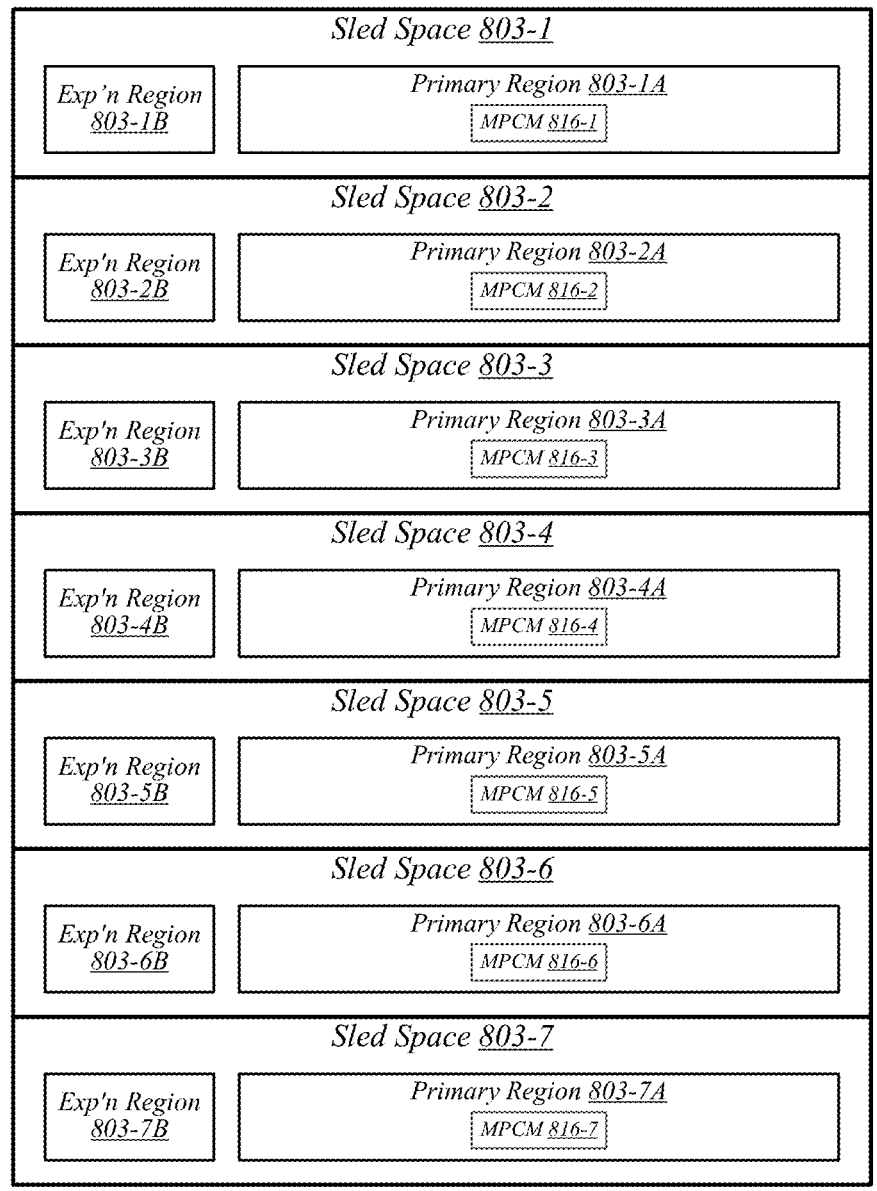
FIG. 8 is a diagram of an example embodiment of a rack architecture.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
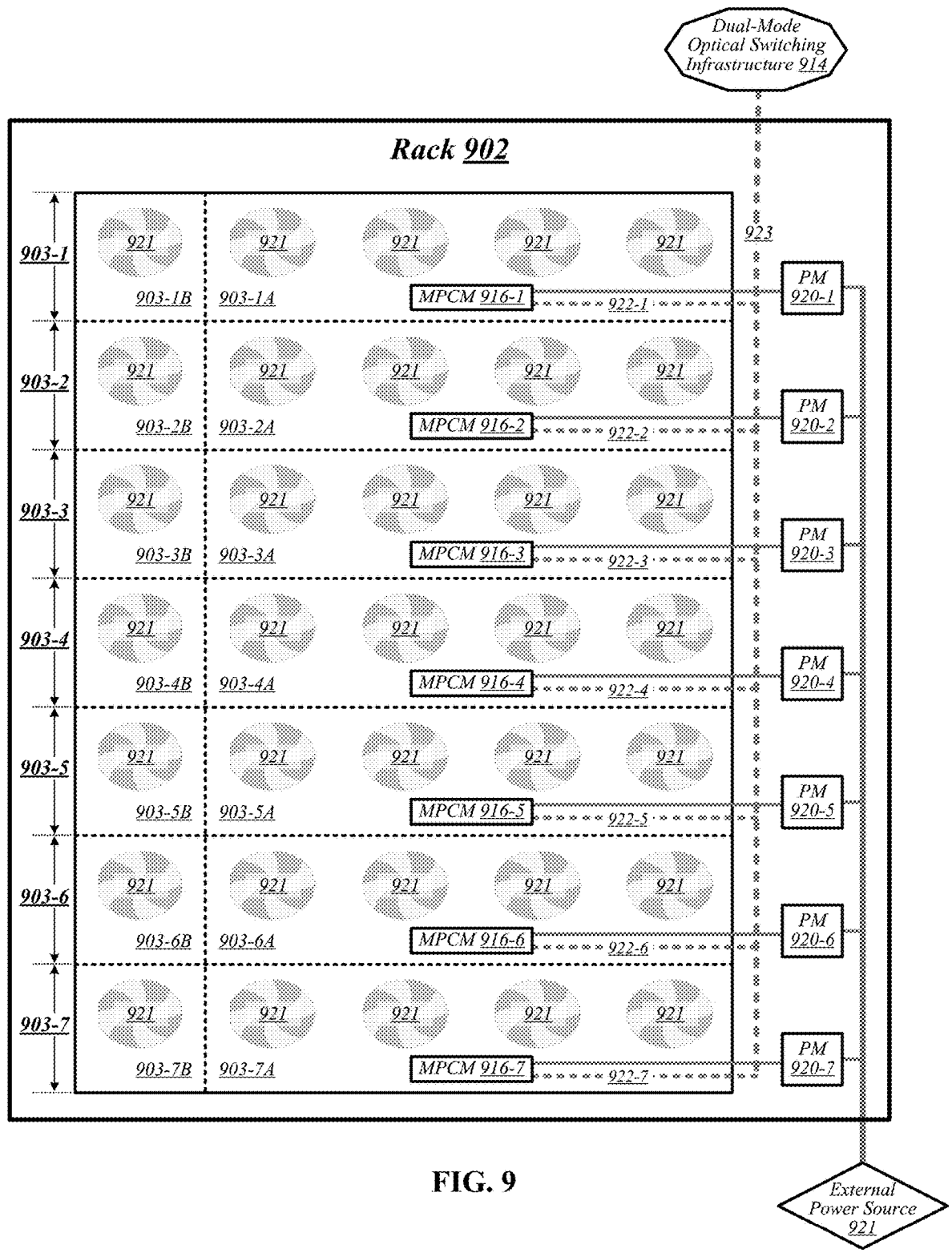
FIG. 9 is a diagram of an example embodiment of a rack.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
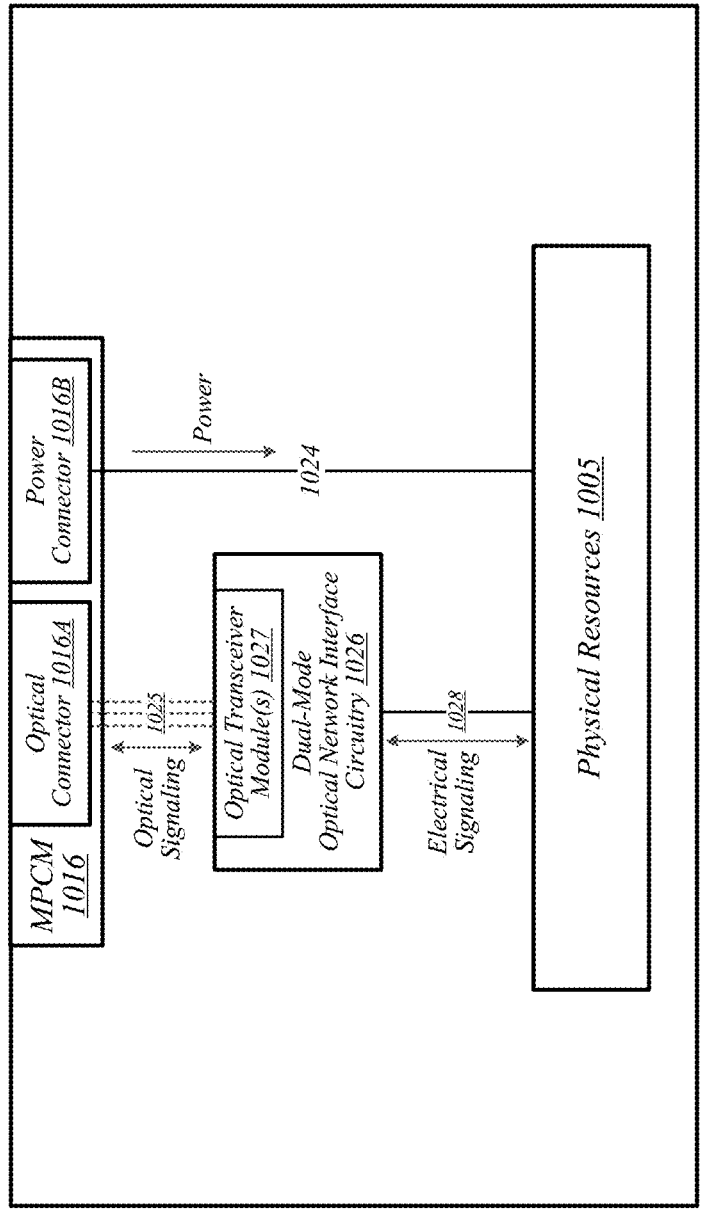
FIG. 10 is a diagram of an example embodiment of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016B to couple with a power connector comprised in the counterpart MPCM. This may generally enable physical resources 1005 of sled 1004 to source power from an external source, via power connector 1016B and power transmission media 1024 that conductively couples power connector 1016B to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. Wired and/or wireless communications techniques can be used. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
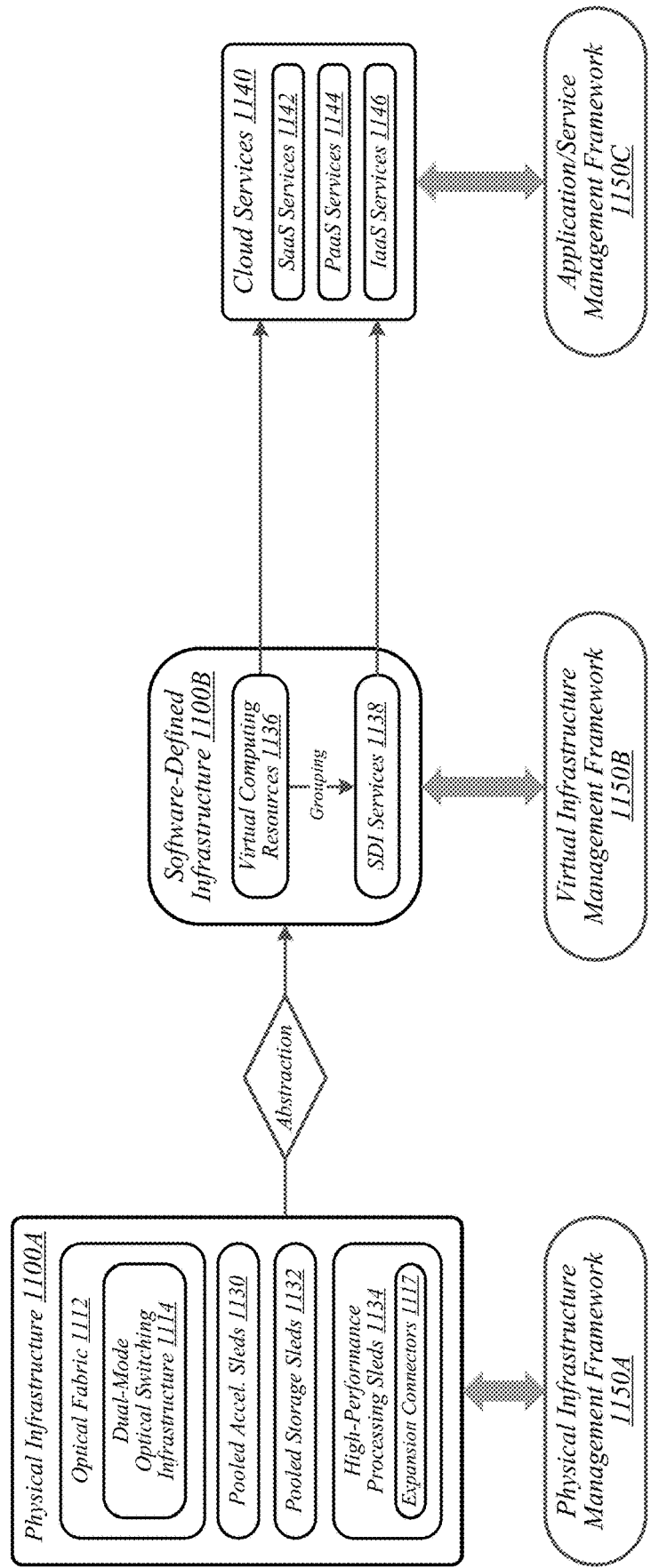
FIG. 11 is a diagram of an example embodiment of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
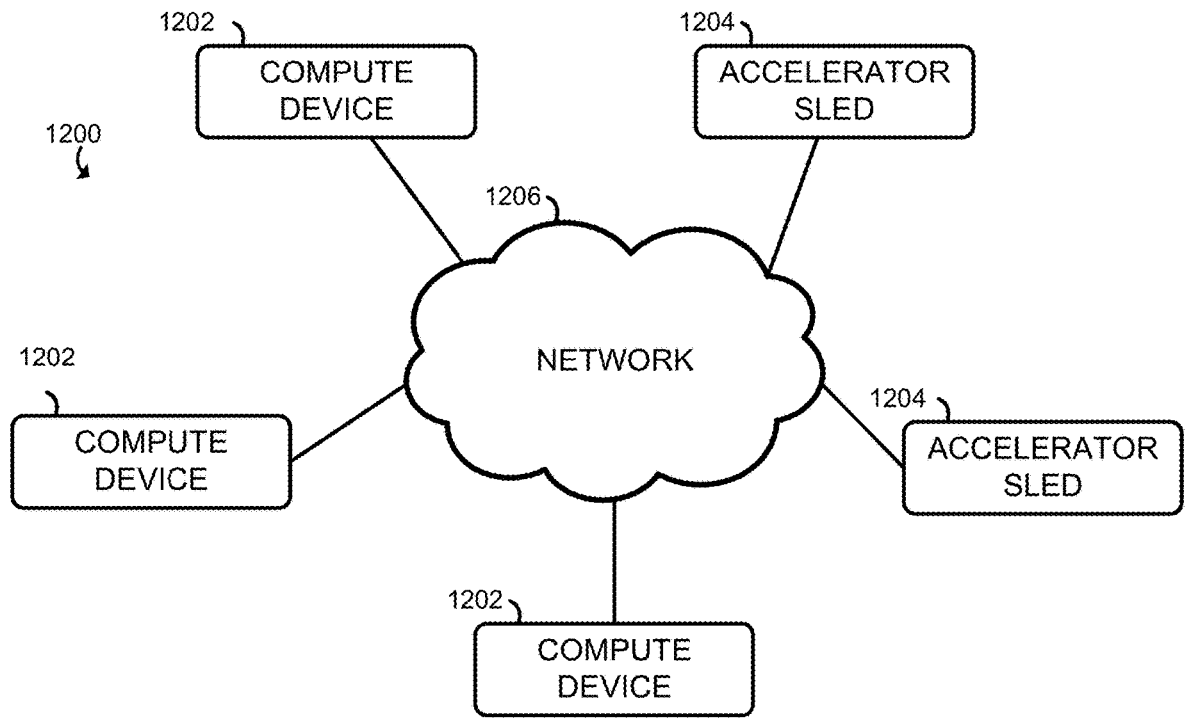
FIG. 12 is a simplified block diagram of at least one embodiment of a network for a remote accelerator interface.

FIG. 12 depicts a system 1200 for a remote accelerator interface that includes one or more compute devices 1202 and one or more accelerator sleds 1204 which are communicatively connected together by an illustrative network 1206. In the illustrative embodiment, compute device 1202 may receive a data packet at its network interface controller (NIC). The compute device 1202 can store the data packet in local memory of the NIC or on a host device. The compute device 1202 can analyze the packet to determine if processing is to take place before the data packet is sent from the NIC to another component of the compute device 1202, such as a processor. For example, the compute device 1202 may determine that the network packet should be decrypted by an accelerator device, that packet inspection should be performed on the network packet by an accelerator device, and/or other suitable processing. Compute device 1202 can use either a local accelerator device (e.g., provided within compute device 1202) or a remote accelerator device (e.g., provided with accelerator sled 1204) to process any content of the data packet.

Network 1206 may be embodied as any type of network capable of communicatively connecting the compute devices 1202 and the accelerator sleds 1204. For example, the system 1200 may be embodied as a high performance computing system or a data center, such as a data center 300 shown in FIG. 3, and the network 1206 may be established through a series of cables, switches, and other devices connecting the various compute devices 1202 and accelerator sleds 1204 of the data center, such as the optical fabric 412 shown in FIG. 4. Of course, the network 1206 may be embodied as another type of a network, such as an Internet-of-things fog network, wireless network, some or all of a telecommunications network, etc.

Figure 13:
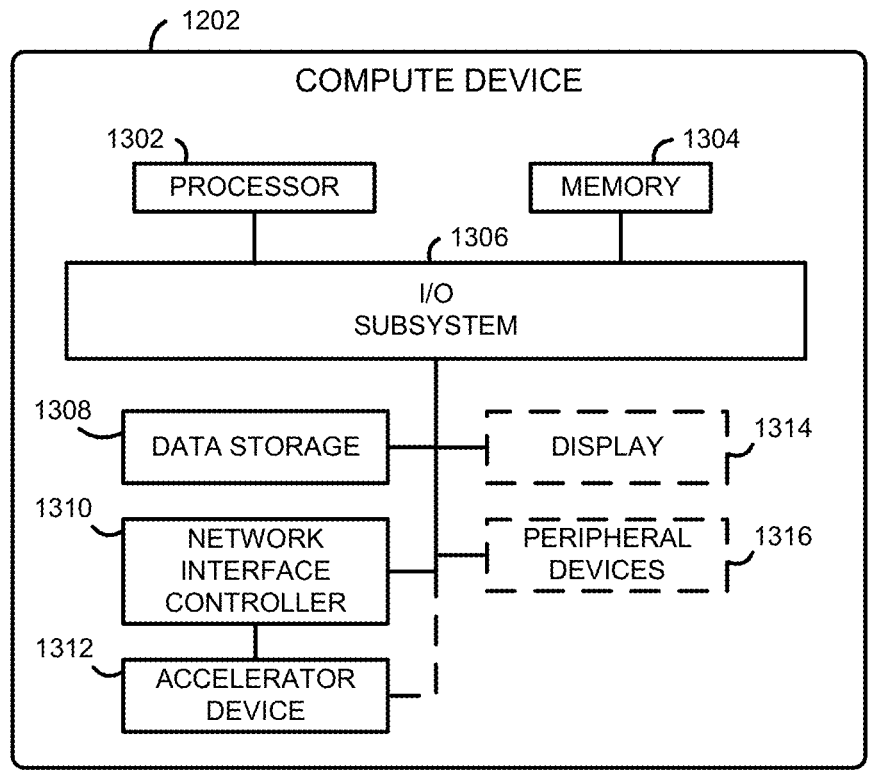
FIG. 13 is a simplified block diagram of at least one embodiment of a compute device.

FIG. 13 depicts an example embodiment of compute device 1202. Compute device 1202 of the system 1200 may be embodied as any type of compute device capable of performing the functions described herein. For example, the compute device 1202 may be embodied as or otherwise be included in, without limitation, a server computer, a desktop computer, a sled or blade of a rack, a smartphone, a cellular phone, a wearable computer, self-driving vehicle, laptop or tablet computer, an embedded computing system, a System-on-a-Chip (SoC), a tablet computer, a notebook computer, a laptop computer, a handset, a messaging device, a camera device, a multiprocessor system, a processor-based system, a consumer electronic device, a compute device in a mobile backhaul device, a compute device used in a wireless network such as a 5G network, and/or any other computing device. In some embodiments, the compute device 1202 may be embodied as a sled 204 as described above in FIG. 2. Additionally, or alternatively, the compute device 1202 may be composed of resources from two or more sleds, such as a sled 204-4 with physical compute resources 205-4 with some or all of a sled 204-1 with physical storage resources 205-1, a sled 204-2 with physical accelerator resources 205-2, and a sled 204-3 with physical memory resources 205-3. In such embodiments, the sled 204-4 with physical compute resources 205-4 may not include any local accelerator devices.

The illustrative compute device 1202 includes the processor 1302, a memory 1304, an input/output (I/O) subsystem 1306, data storage 1308, a network interface controller 1310, and an accelerator device 1312. In some embodiments, one or more of the illustrative components of the compute device 1202 may be incorporated in, or otherwise form a portion of, another component. For example, the memory 1304, or portions thereof, may be incorporated in the processor 1302 in some embodiments.

The processor 1302 may be embodied as any type of processor capable of performing the functions described herein. For example, the processor 1302 may be embodied as a single or multi-core processor(s), a single or multi-socket processor, a digital signal processor, a microcontroller, or other processor or processing/controlling circuit. Similarly, the memory 1304 may be embodied as any type of volatile or non-volatile memory or data storage capable of performing the functions described herein. In operation, the memory 1304 may store various data and software used during operation of the compute device 1202 such as operating systems, applications, programs, libraries, and drivers. The memory 1304 is communicatively coupled to the processor 1302 via the I/O subsystem 1306, which may be embodied as circuitry and/or components to facilitate input/output operations with the processor 1302, the memory 1304, and other components of the compute device 1202. For example, the I/O subsystem 1306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1306 may form a portion of a system-on-a-chip (SoC) and be incorporated, along with the processor 1302, the memory 1304, and other components of the compute device 1202 on a single integrated circuit chip.

The data storage 1308 may be embodied as any type of device or devices configured for the short-term or long-term storage of data. For example, the data storage 1308 may include any one or more memory devices and circuits, memory cards, hard disk drives, solid-state drives, or other data storage devices. In some embodiments, the data storage 1308 may be embodied as some or all of a sled 204-1 with physical storage resources 205-1.

The network interface controller (NIC) 1310 may be embodied as any type of interface capable of interfacing the compute device 1202 with the network 1206. The NIC 1310 may also be referred to or be embodied as a host fabric interface or network interface card. It should be appreciated that the NIC 1310 need not be embodied as a physical card, but could be embodied as, e.g., all or a portion of a chip or package. The NIC 1310 may be capable of interfacing with any appropriate cable type, such as an electrical cable or an optical cable. The NIC 1310 may be configured to use any one or more communication technology and associated protocols (e.g., Ethernet, Bluetooth®, Wi-Fi®, WiMAX, near field communication (NFC), Omni-Path, InfiniBand, etc.). In the illustrative embodiment, the NIC 1310 includes additional electrical components such as a dedicated processor and memory. The illustrative NIC 1310 may include a mesh memory or a fabric memory. The illustrative NIC 1310 may include various agents, which may be discrete hardware, firmware, or software components configured to perform particular tasks related to the functionality of the NIC 1310. Additionally, or alternatively, in some embodiments, the NIC 1310 may include a pipeline architecture in which at least some of the functions performed by the NIC 1310 are performed by dedicated hardware devices or sub-components. Furthermore, in some embodiments, the NIC 1310 may be in a package separate from the processor 1302, in a multi-chip package with the processor 1302, or in a system-on-a-chip with the processor 1302.

Of course, in some embodiments, the compute device 1202 may include additional components often found in a compute device 1202, such as a display 1314 and/or one or more peripheral devices 1316. The peripheral devices 1316 may include a keyboard, a mouse, a camera, etc. The display 1314 may be embodied as any type of display on which information may be displayed to a user of the compute device 1202, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Accelerator device 1312 may be embodied as any type of device capable of performing certain computing tasks more quickly or more efficiently (e.g., lower time and/or lower power) relative to the processor 1302. For example, the accelerator device 1312 may be particularly well suited for tasks such as matrix multiplication, implementing a neural network, image processing, encryption, decryption, etc. The accelerator device 1312 may be embodied as, for example, a field programmable gate array (FPGA), an application specific integrated circuit (ASIC), a graphics processing unit (GPU), etc. The accelerator device 1312 may be connected to other components of the compute device 1202 such as the processor 1302 and the memory 1304 through any suitable connection, such as a PCIe connection, a QuickPath interconnect, a HyperTransport interconnect, etc. In the illustrative embodiment, the accelerator device 1312 has a direct, dedicated connection to the NIC 1310. Additionally, or alternatively, in some embodiments, the accelerator device 1312 may be on the same chip as the NIC 1310, in a multi-chip package with the NIC 1310, or in a system-on-a-chip with the NIC 1310. In some embodiments, the compute device 1202 may not include a local accelerator device 1312.

In some cases, processor 1302 or NIC 1310 can determine that accelerator device 1312 is to be used to process at least a portion of a packet. If the compute device 1202 uses a local accelerator device 1312 to process a portion of the data packet, the compute device 1202 can provide access to the data packet (or a portion thereof) from the memory of the NIC 1310 to the local accelerator device 1312. For example, a pointer or reference to the data packet (or portion thereof) can be provided to local accelerator device 1312 or the data packet (or portion thereof) can be copied for use by the local accelerator device 1312. The local accelerator device 1312 can process the data packet and then make available the processed data packet.

In some cases, processor 1302, NIC 1310, or accelerator 1312 can determine that a remote accelerator device (e.g., accelerator sled 1204) is to be used to process at least a portion of a packet. If the compute device 1202 uses a remote accelerator device (e.g., accelerator sled 1204) to process the data packet (or portion thereof), compute device 1202 may encapsulate the data packet in a network packet, such as an Ethernet packet, and send the network packet, including the encapsulated data packet, to accelerator sled 1204 for processing using its remote accelerator device.

The encapsulating network packet may include additional information, such as metadata associated with the data packet (e.g., packet flow, packet state information, or pre-parsed details of the data packet), event data describing what functions should be performed on the data packet, packet queue depth information, decryption or encryption algorithms and keys to use, and so forth. In addition to encapsulating a data packet to be sent to the remote accelerator device 1408, the NIC 1310 may also encapsulate other commands to be sent to the remote accelerator device 1408, such as a memory transaction, a command, an event, etc.

Remote accelerator device (e.g., remote accelerator device 1408) can de-encapsulate the data packet, process the data packet, re-encapsulate the data packet, and send the encapsulated data packet back to the NIC 1310 of compute device 1202. The processed data packet can be stored (e.g., local memory of NIC 1310). After the data packet has been processed, the compute device 1202 may move the data packet from the local memory of NIC 1310 to another component of the compute device 1202, such as memory 1304 or a cache of processor 1302.

Figure 14:
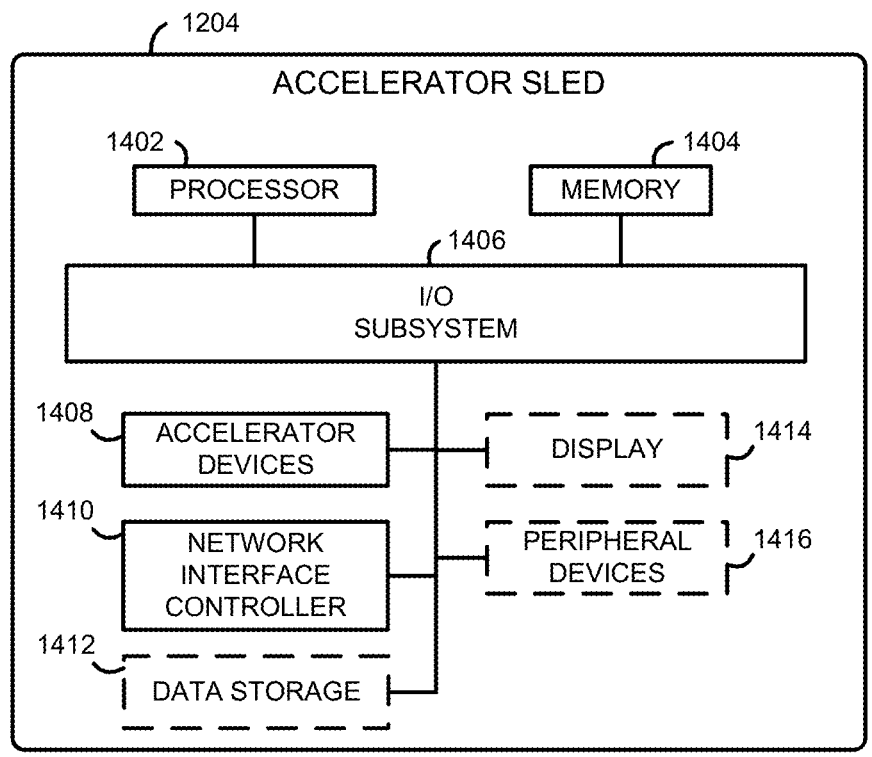
FIG. 14 is a simplified block diagram of at least one embodiment of an accelerator sled.

FIG. 14 depicts an illustrative embodiment of accelerator sled 1204. The illustrative accelerator sled 1204 includes a processor 1402, a memory 1404, an I/O subsystem 1406, one or more accelerator devices 1408, a network interface controller 1410, data storage 1412, an optional display 1414, and optional peripheral devices 1416. Each of the processor 1402, the memory 1404, the I/O subsystem 1406, the one or more accelerator devices 1408, the network interface controller 1410, the data storage 1412, the optional display 1414, and the optional peripheral devices 1416 may be similar to the corresponding components of the compute device 1202. As such, the description of those components of the compute device 1202 is equally applicable to the description of those components of the accelerator sled 1204 and is not repeated herein in the interest of clarity of the description. However, it should be appreciated that, in some embodiments, the architecture or configuration of the accelerator sled 1204 may be significantly different from the architecture or configuration of the compute device 1202. For example, the accelerator sled 1204 may have a processor 1402 that is relatively slow as compared to the processor 1302, and/or the accelerator sled 1204 may include several accelerator devices 1408 that are relatively powerful and/or numerous as compared to the accelerator device 1312 of the compute device 1202.

Accelerator sled 1204 can be embodied as any type of compute device capable of performing the functions described herein. In the illustrative embodiment, the accelerator sled 1204 is embodied as a sled or blade of a rack in a data center. In such an embodiment, the accelerator sled 1204 may be composed of resources from two or more sleds, such as a sled 204-4 with physical compute resources 205-4 with some or all of a sled 204-1 with physical storage resources 205-1, a sled 204-2 with physical accelerator resources 205-2, and a sled 204-3 with physical memory resources 205-3.

Additionally or alternatively, the accelerator sled 1204 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device. In some embodiments, the accelerator sled 1204 may be embodied as a sled 204 as described above in FIG. 2.

Figure 15:
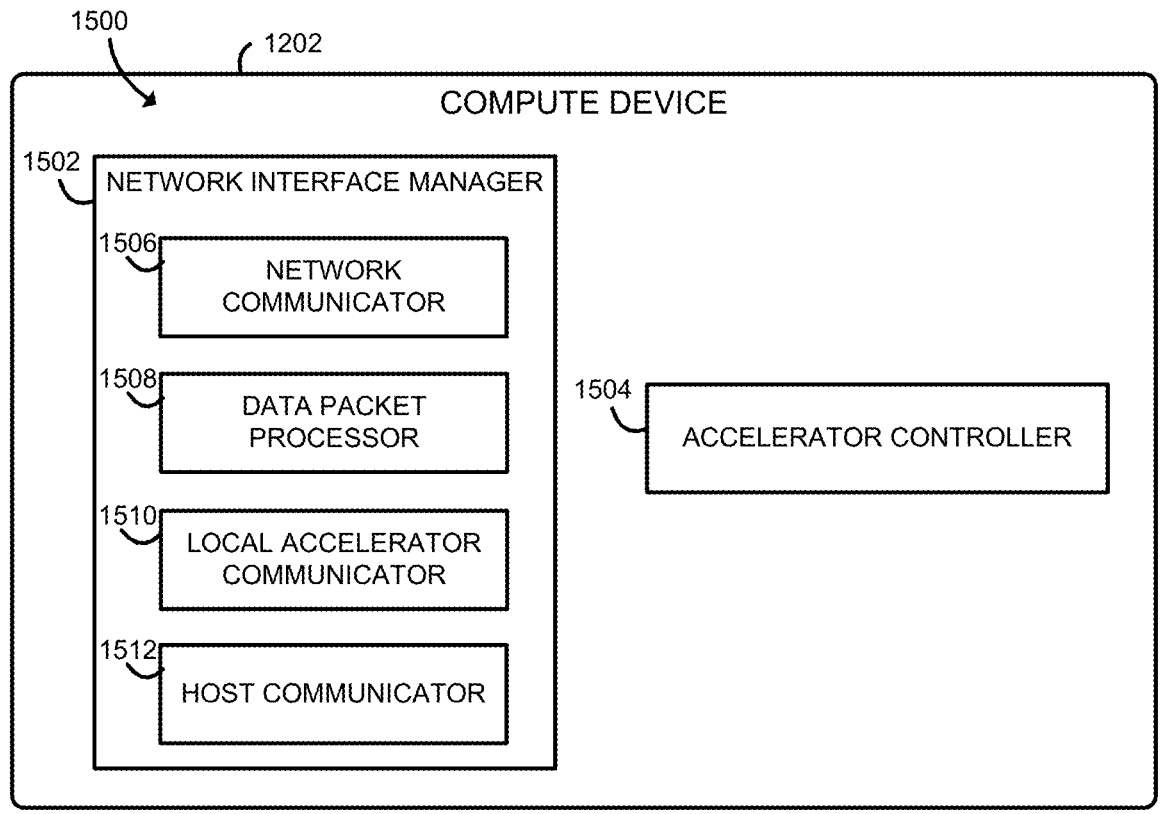
FIG. 15 is a block diagram of at least one embodiment of an environment that may be established.

FIG. 15 depicts an environment that compute device 1202 may establish according to an embodiment. The illustrative environment 1500 includes a network interface manager 1502 and an accelerator controller 1504. The various components of the environment 1500 may be embodied as hardware, firmware, software, or a combination thereof. As such, in some embodiments, one or more of the components of the environment 1500 may be embodied as circuitry or collection of electrical devices (e.g., a network interface manager circuit 1502, an accelerator controller circuit 1504, etc.). It should be appreciated that, in such embodiments the network interface manager circuit 1502, the accelerator controller circuit 1504, etc., may form a portion of one or more of the processor 1302, the I/O subsystem 1306, the network interface controller 1310, and/or other components of the compute device 1202. Additionally, in some embodiments, one or more of the illustrative components may form a portion of another component and/or one or more of the illustrative components may be independent of one another. Further, in some embodiments, one or more of the components of the environment 1500 may be embodied as virtualized hardware components or emulated architecture, which may be established and maintained by the processor 1302 or other components of the compute device 1202.

The network interface manager 1502 is configured to control the network interface controller 1310. The network interface manager 1502 includes a network communicator 1506, a data packet processor 1508, a local accelerator communicator 1510, and a host communicator 1512. The network communicator 1506 is configured to send and receive packets and/or other messages to and from the network 1206. The network communicator 1506 may send packages or other messages from the memory of the network interface controller 1310 and may receive packages or other messages from the network 1206 to the memory of the network interface controller 1310. The network communicator 1506 may directly control the physical interface to the network 1206, such as an electrical cable or an optical cable.

The data packet processor 1508 is configured to process, manage, and control packets and other messages that are to be sent or have been received by the network interface controller 1310. The data packet processor 1508 may analyze incoming packets and message in order to determine what action should be taken. The data packet processor 1508 may consider any suitable factor or parameter in determining what action should be taken with respect to any given packet, such as packet headers, packet type, packet payload, metadata relating to the packet, etc. In the illustrative embodiment, the data packet processor 1508 analyzes whether an incoming data packet should be processed by an accelerator device (e.g., local or remote).

For example, the data packet processor 1508 may determine that a data packet is encrypted, and the data packet should be decrypted by an accelerator device. If the data packet processor 1508 determines that the data packet should be processed, the data packet processor 1508 may then determine whether the data packet should be processed using a local accelerator device 1312 or a remote accelerator device 1408 (or both). If the data packet should be pre-processed using a local accelerator device 1312, the data packet processor 1508 make available some or all of the data packet to the local accelerator device 1312, where it may be processed (e.g., decrypted) and then provided back to the data packet processor 1508.

If the data packet should be processed using a remote accelerator device 1408, the data packet processor 1508 encapsulates the data packet with an encapsulating network packet. The encapsulating network packet may include some all of the data packet or only a portion of the data packet, such as only the encrypted payload of the data packet without some or all of the packet headers. The encapsulating network packet may include metadata or other information that indicate relevant parameters of the data packet. The encapsulating network packet may be embodied as an Ethernet packet and includes one or more of: a virtual local area network (VLAN) tag, Multi-protocol label switching (MPLS) tags, MAC source or destination address information, IP source or destination address, meta-data, and so forth.

The encapsulating network packet may indicate information such as, e.g., that the encapsulating network packet encapsulates the data packet, which accelerator device 1408 to use from among a plurality of accelerator devices 1408, a device partition or function to be executed, which processing elements are needed, the exact type of processing to be used, pre-parsed details of the data packet, event data describing what functions should be performed on the data packet, encryption keys to use, transmission control protocol (TCP) or user datagram protocol (UDP) parameters, parameters of machine learning algorithms, and so forth.

After the remote accelerator device 1408 processes content, the network interface manager 1502 may receive a return encapsulating network packet, which the data packet processor 1508 may de-encapsulate to recover the processed data packet. The data packet processor 1508 stores the processed data packet into memory of the network interface controller 1310. The data packet processor 1508 may then take a suitable subsequent action, such as passing the processed data packet to the memory 1304 or the processor 1302. Of course, the data packet processor 1508 may pass the processed data packet to the processor 1302 by first sending the processed data packet to another component of the compute device 1202, such as the memory 1304.

Network interface manager 1502 may provide for processing of data packets to be sent by the network interface controller 1310 in addition to providing for processing of data packets received by the network interface controller 1310. For example, the network interface controller 1310 may determine that a packet to be sent should be processed and provide for such processing by use of a local accelerator device 1312 or a remote accelerator device 1408 in a similar manner as the processing described above for a received data packet.

In some embodiments, the network interface manager 1502 may cause encapsulated network packets to be sent to a remote compute device 1202 for processing by a remote accelerator device 1408.

In some embodiments, the data packet processor 1508 may facilitate transactions between two accelerator devices 1312, such as between an accelerator device 1312 on the local compute device 1202 and an accelerator device 1312 on a remote compute device 1202, between an accelerator device 1312 and an accelerator device 1408 on an accelerator sled 1204, or between an accelerator device 1408 and an accelerator device 1312.

Data packet processor 1508 may receive a transaction from the accelerator device 1312 to be sent to a remote accelerator device 1312 or 1408. The data packet processor 1508 may encapsulate such a transaction in an encapsulating network packet and may include transaction metadata in the encapsulating network packet. The data packet processor 1508 may include metadata such as the transaction type.

In some embodiments, the data packet processor 1508 may specify a priority field in the VLAN tag of the encapsulating Ethernet network packet to indicate whether the network packet encapsulates a transaction and/or the type of the encapsulated transaction. The data packet processor 1508 may then send the encapsulating network packet to the remote accelerator device 1312, 1408.

The data packet processor 1508 may receive an encapsulated transaction embodied as an encapsulating network packet from a remote compute device 1202 or accelerator sled 1204. The encapsulating network packet may be embodied as any suitable network packet, such as an Ethernet packet, an InfiniBand packet, or an Omni-Path packet. The data packet processor 1508 may de-encapsulate an encapsulating network packet and pass the transaction content to the accelerator device 1312, with or without the transaction metadata included in the encapsulating network packet.

In some embodiments, the data packet processor 1508 may receive response data from the remote accelerator device 1312, 1408, which may be encapsulated as well. It should be appreciated that such functionality may allow several accelerator devices 1312, 1408 to communicate and coordinate together in a low-latency manner without requiring interaction with a processor 1302. For example, the compute device 1202 or a remote compute device 1202 may load one or more functions, programs, and/or the like into two or more accelerator devices 1312, 1408, which may then execute the one or more functions, programs, and/or the like with use of the encapsulated transactions described above to communicate between the accelerator devices 1312, 1408.

The local accelerator communicator 1510 is configured to send and receive messages and signals to and from the accelerator device 1312. The network communicator 1506 may send messages or other data from the memory of the network interface controller 1310 and may receive messages or other data from the accelerator device 1312 to the memory of the network interface controller 1310.

The host communicator 1512 is configured to send and receive message and signals to and from other components of the compute device 1202, such as the I/O subsystem 1306, the memory 1304, and/or the processor 1302. The host communicator 1512 may send messages or other data from the memory of the network interface controller 1310 and may receive messages or other data from other components of the compute device 1202 to the memory of the network interface controller 1310.

The accelerator controller 1504 is configured to control the accelerator device 1312. The accelerator controller 1504 may load programs or other data onto the accelerator device 1312, may execute programs on the accelerator device 1312, and may read data from the accelerator device 1312. The accelerator controller may prepare transactions to be sent to remote accelerator devices 1312, 1408. Preparing a transaction may include determining a transaction type, such as a memory read request, a memory write request, or an instruction to perform a certain operation. The transaction may also include transaction data, such as a memory location, an address or location of the destination accelerator device 1312, 1408, data to be written to memory, and/or the like.

In the illustrative embodiment, the accelerator controller 1504 sends the transaction information to the network interface manager 1502, which may then fully prepare the transaction, such as by including metadata or formatting the transaction data, encapsulate the transaction in an encapsulating network packet, and send the encapsulating network packet to a remote compute device 1202 or accelerator sled 1204. Additionally, or alternatively, the accelerator controller 1504 may send a fully prepared transaction, with or without metadata, to the network interface manager 1502, and the accelerator controller 1504 may encapsulate the transaction in a network packet before passing the encapsulating network packet to the network interface manager 1502 for transmission.

Accelerator controller 1504 may receive transactions from remote accelerator devices 1312 or 1408 passed through the network interface manager 1502. In the illustrative embodiment, the network interface manager 1502 will provide unencapsulated transaction data, with or without metadata, to the accelerator controller 1504. Additionally or alternatively, the network interface manager 1502 may provide the transaction data, with or without metadata, encapsulated in a network packet to the accelerator controller 1504, which the accelerator controller 1504 may remove or otherwise process in order to access the transaction data. The accelerator controller 1504 may then process the transaction data, such as by reading or writing data, loading a program or operation into the accelerator device 1312, executing a program or operation on the accelerator device 1312, etc. Execution of the transaction may provide an output, which the accelerator controller 1504 may send through another transaction to another accelerator device 1312, 1408.

Additionally, or alternatively, in some embodiments, the accelerator controller 1504 may process a data packet or data in a data packet. For example, as described above, the network interface manager 1502 may provide a local accelerator device 1312 with a data packet received by the network interface controller 1310 for processing. The accelerator controller 1504 may use the accelerator device 1312 to process the data packet or data in the data packet and pass the processed data packet or data in the data packet back to the network interface manager 1502.

Figure 16:
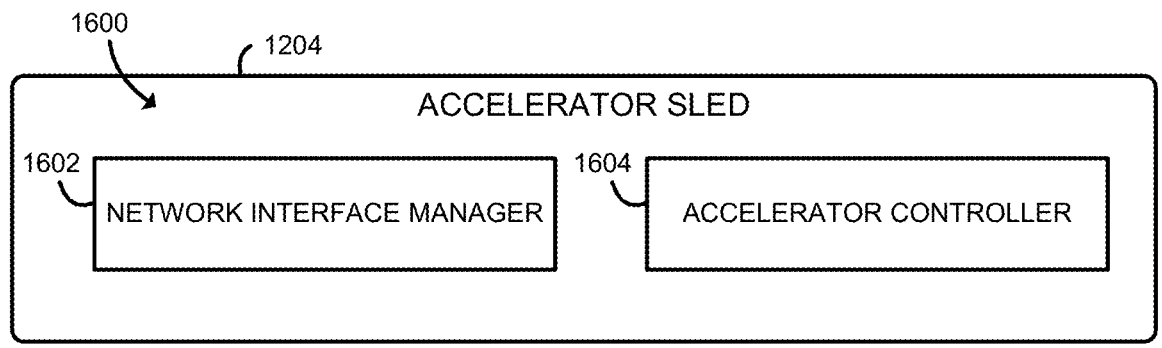
FIG. 16 is a block diagram of at least one embodiment of an environment that may be established.

FIG. 16 depicts an example environment that the accelerator sled 1204 can establish. The illustrative environment 1600 includes a network interface manager 1602 and an accelerator controller 1604. The various components of the environment 1600 may be embodied as hardware, firmware, software, or a combination thereof. As such, in some embodiments, one or more of the components of the environment 1600 may be embodied as circuitry or collection of electrical devices (e.g., a network interface manager circuit 1602, an accelerator controller circuit 1604, etc.).

Network interface manager circuit 1602, the accelerator controller circuit 1504, etc., may form a portion of one or more of the processor 1402, the I/O subsystem 1406, the network interface controller 1410, and/or other components of the accelerator sled 1204. Additionally, in some embodiments, one or more of the illustrative components may form a portion of another component and/or one or more of the illustrative components may be independent of one another. Further, in some embodiments, one or more of the components of the environment 1600 may be embodied as virtualized hardware components or emulated architecture, which may be established and maintained by the processor 1402 or other components of the accelerator sled 1204.

The network interface manager 1602 is configured to control the network interface controller 1410. In the illustrative embodiment, the network interface manager 1602 may receive an encapsulating network packet from a remote compute device 1202. The network interface manager 1602 may de-encapsulate the encapsulating network packet to access the encapsulated data packet included in the network packet. The network interface manager 1602 may then pass the data packet or the data in the data packet to the accelerator controller 1604 for processing by the accelerator device 1408. The network interface manager 1602 may then receive the processed data packet or the processed data in the data packet from the accelerator controller 1604. The network interface manager 1602 may then encapsulate the data packet in a network packet, and send the encapsulating network packet to the remote compute device 1202.

Additionally, or alternatively, the network interface manager 1602 may perform similar functions as the network interface manager 1502, such as encapsulating incoming data packets for sending to a remote compute device 1202 for pre-processing or sending and receiving transactions to and from the accelerator device 1408 for communication with remote accelerator devices 1312, 1408.

The accelerator controller 1604 is configured to control the accelerator device 1408. In the illustrative embodiment, the accelerator controller 1604 receives a data packet or data in a data packet from the network interface manager 1602, processes the data packet or data in the data packet, and passes the processed data or data packet to the network interface manager 1602. Additionally, or alternatively, the accelerator controller 1604 may perform similar functions as the accelerator controller 1504, such as generating transactions for processing by remote accelerator devices 1312, 1408 or processing transactions received from remote accelerator devices 1312, 1408.

According to some embodiments, an accelerator sled can indicate information in an encapsulating packet that can be used by a compute device. The compute device can use the information to determine how to interact with the accelerator sled. For example, information such as accelerator selection, accelerator command, flow identifier, priority, queue level, buffer level, and so forth can be used to determine how to process content of the packet or to interact with the remote device. For example, commands such as memory transaction, compression, de-compression, encryption, decryption, and so forth can be performed. For example, if the information indicates a queue fullness level for a particular accelerator, then the compute device can determine to send packets to other accelerators with lower fullness levels. If the information indicates a flow or state information related to a packet or task, then the packet and task can be assigned to an accelerator that also processes packets with the same flow or state. An encapsulating packet can include a priority designation to indicate a priority level to assign a packet and corresponding task such that the receiver can use the priority level designation to allocate to the packet and corresponding task.

Figure 17:
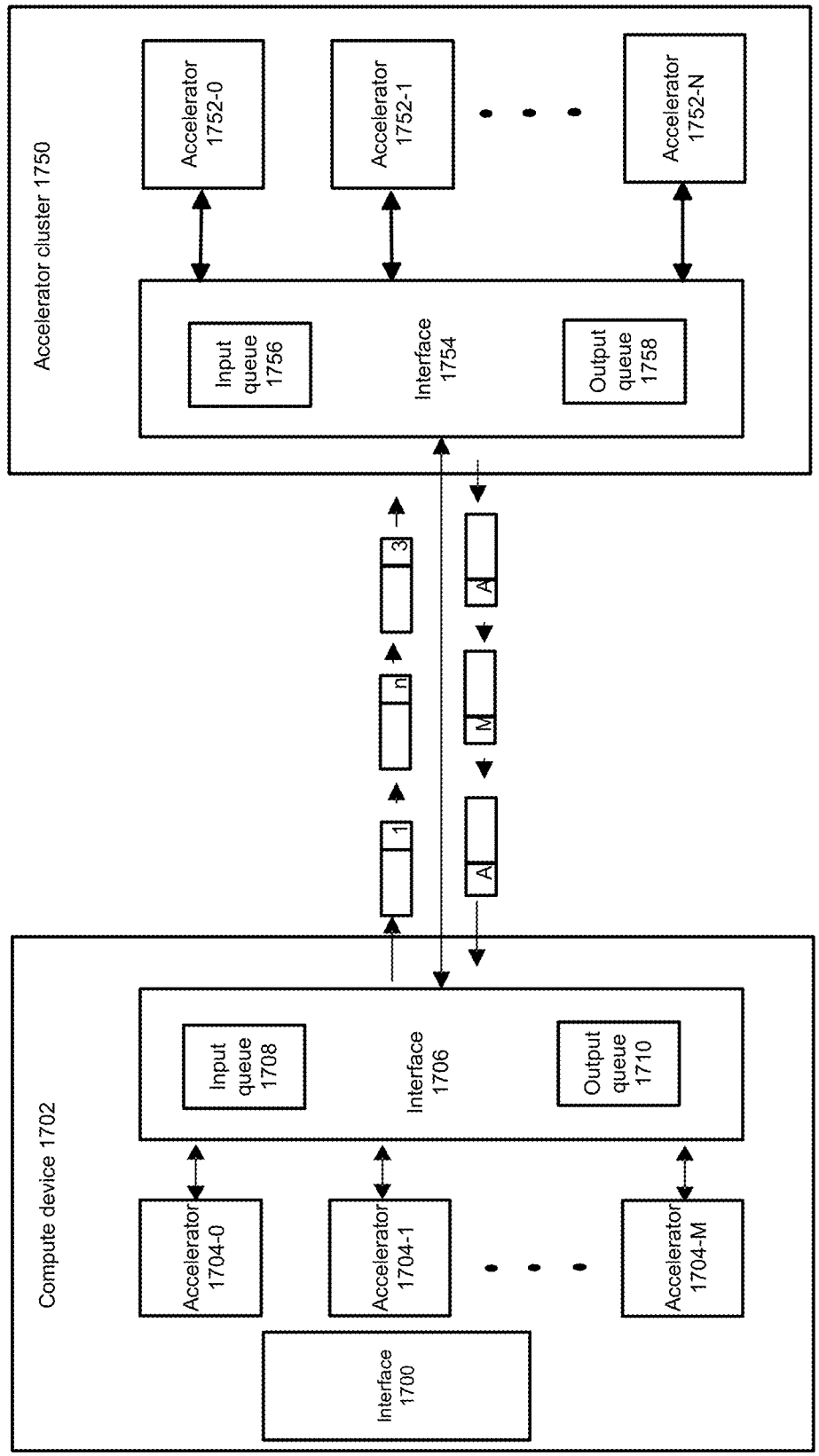
FIG. 17 depicts an example system.

FIG. 17 depicts an example system. Compute device 1702 can receive a packet from another device using interface 1700 and process any content of the packet (e.g., header and/or payload) using any of accelerators 1704-0 to 1704-M and/or using any of accelerators 1752-0 to 1752-N. Interface 1700 can be any kind of interface, including one or more of: a network interface, an interconnect (standardized or proprietary), a serializer/de-serializer (SERDES), and so forth. Interface 1700 can perform media access control (MAC) packet parsing to determine flow and/or state information of received packets that are not encrypted. For example, flow information can be related packet, sequence, or connection information. Flow can include connection identifier (e.g., connection ID from IETF QUIC protocol), an HTTP header, or other characteristics of a packet header or payload. For example, flow associated with a TCP packet can be determined from one or more of: destination port or destination IP address. For example, flow information can include one or more of: MAC context information, internet protocol (IP) context information, transmission control protocol (TCP) context information, application context information, and so forth. For example, state information can include indication of packet coalescing, TCP connection state (e.g., listen, syn-sent, syn-received, and so forth) (as defined in RFC 793), protocol state, among others.

For received non-encrypted packets, interface 1700 can determine flow and/or state information. For encrypted packets, interface 1700 can request a local or remote accelerator to perform decryption and interface 1700 or an accelerator can determine flow and/or state. Interface 1700 or another device can provide flow and/or state information in an encapsulating packet (e.g., header) to be transmitted using, e.g., interface 1706. The encapsulating packet that carries the portion of the received packet can include information in its header concerning flow and/or state information.

In some cases, interface 1706 can encapsulate a portion of the content of the received packet into an encapsulating packet and transmit the encapsulating packet to accelerator cluster 1750 for processing using one or more of accelerators 1752-0 to 1752-N. The portion of the content can include content of the received packet and/or content that is determined using one or more of accelerators 1704-0 to 1704-M after processing content of the received packet. In some embodiments, the encapsulating packet that carries the portion of the received packet can include information in its header such that the receiver (e.g., accelerator cluster 1750) can use the information to decide how to process or handle content of the encapsulating packet. For example, the encapsulating packet can be compliant with Ethernet and information could be included in an Ethernet-compliant header. Although other specifications or standards can be used to connect compute device 1702 and accelerator cluster 1750, including one or more of: PCIe, Intel OmniPath, an optical interconnect, and so forth.

In some examples, in addition to or as an alternative to using a VLAN tag or MPLS header, portions of the MAC addresses (e.g., MAC source or destination address) could refer to different flow identifiers and the flow identifiers can be used to identify an accelerator to use to process packet content. For example, a flow identifier can be allocated for processing by an accelerator 1750-0 and another flow identifier can be allocated for processing by an accelerator 1750-1. A table stored in memory and accessible to accelerator cluster 1750 can be used to select a particular accelerator based on flow or state identifiers. A particular flow can be allocated to a particular accelerator so that a context of the flow is updated and re-used instead of sharing context among multiple accelerators and using coherency to maintain consistency, although sharing context across multiple accelerators can be used in various embodiments.

Packet flows (e.g., TCP connections) received at accelerator cluster 1750 could be mapped to particular accelerators among accelerators 1752-0 to 1752-N of accelerator cluster 1750. For example, various bits of a packet header (e.g., VLAN tag, MPLS header, or others) could be manipulated or set by interface 1706 of compute device 1702 to specify how accelerator cluster 1750 is to process a received packet or which particular accelerator among accelerators 1752-0 to 1752-N is to process a packet. For example, an event packet to be sent to accelerator 1752-0 could be identified using a value of 00 in a VLAN tag and a second data packet destined to a second accelerator 1752-3 could be identified using a value of 01 in a header VLAN tag.

In some examples, prioritization of processing can occur based on flow identifiers, contexts, states, and requesting applications. Priority levels can be assigned based on input buffers or queues such that an input buffer or queue has a higher priority level than another input buffer or queue. Likewise, priority can be provided for output buffers or queues such that an output buffer or queue has a higher priority level than another output buffer or queue.

Interface 1754 can receive packets transmitted from interface 1706. Interface 1754 can use an input queue 1756 to store received packets from interface 1706 and other devices for processing by one or more of accelerators 1752-0 to 1752-N. Interface 1754 can access content from output queue 1758 for transmission to interface 1706 or another device. Although a single input queue 1756 and a single output queue 1758 are depicted, multiple instances of input queue 1756 and output queue 1758 can be used to store respective input and output traffic. For example, priority levels can be associated with an input or output buffer so that packets with a higher priority level can be allocated more bandwidth for transmission or higher priority in terms of use of an accelerator.

For example, accelerators 1752-0 to 1752-N can perform any of compression, encryption, decryption, artificial intelligence-based inferences, Remote Direct Memory Access (RDMA), packet parsing, packet classification, packet forwarding determinations, TCP header processing, table look-up (e.g., flow look-up), and so forth.

Accelerator cluster 1750 can transmit packets to compute device 1702 that provide responses to use of an accelerator among accelerators 1752-0 to 1752-N. In other examples, accelerator cluster 1750 can send messages to compute device 1702 to indicate information such as a state of input queues that can receive packets from compute device 1702 (e.g., fullness level). In some embodiments, accelerator cluster 1750 can transmit packets to compute device 1702 (e.g., using interface 1754) and indicate various state or flow information to compute device 1702. For example, accelerator cluster 1750 can form a packet and use the header and/or payload of the packet to include state or flow information, state of input or output queues (e.g. fullness level) or other information. Compute device 1702 can use the information in the header to determine how to handle the received packet from accelerator cluster 1750 or how to interact with accelerator cluster 1750.

In a case where accelerator cluster 1750 informs compute device 1702 of a fullness level of input queue 1756, one or more bits of a VLAN tag (e.g., priority bits) of the Ethernet-compliant header could include an input queue (or other queue) depth, indicate if input queue (e.g., input queue 1756) is currently above or below a threshold, and/or identify the input queue. For example, two bits of the VLAN tag could indicate the input queue is below a first threshold, between the first and second thresholds, between the second and third thresholds, or above the third threshold. One or more bits in an MPLS header could be used to convey a state of any of accelerators 1752-0 to 1752-N. Such fullness level information could inform compute device 1702 when and how to throttle transfers or transmissions to accelerator cluster 1750. An input queue level that is too high can signal to compute device 1702 to select another accelerator. For example, compute device 1702 could choose an alternative accelerator cluster or device that is underutilized or less utilized as an alternative to using accelerator cluster 1750. The alternative accelerator can be available on compute device 1702. The alternative accelerator device can provide similar or same functionality as that provided by an accelerator in accelerator cluster 1750. Likewise, compute device 1702 can indicate an input queue level (e.g., level of input queue 1708) or output queue level (e.g., level of output queue 1710) to accelerator cluster 1750.

Accelerator cluster 1750 can inform compute device 1702 to send additional content for processing or pause/stop indicator to inform compute device 1702 to slow or stop sending requests for use of an accelerator of accelerator cluster 1750. A pause/stop indicator can be a priority flow control (PFC) packet in compliance with any version of specifications associated with IEEE 802.1 (2010).

The following provides an example usage of compute device 1702 and accelerator cluster 1750. Packets received at compute device 1702 could be determined to be processed using compression. The packets can be encapsulated in an encapsulating packet and sent to a particular accelerator among accelerators 1752-0 to 1752-N in accelerator cluster 1750 for compression. Packet characteristics (e.g., flow identifier, packet number, packet order) can be transmitted to accelerator cluster 1750 using a header or meta-data of the encapsulating packet. Accelerator cluster 1750 selects an accelerator among accelerators 1752-0 to 1752-N for use and provides the packet (or portion thereof) and characteristics from the meta-data to a particular accelerator among accelerators 1752-0 to 1752-N for use in processing the packet(s). An accelerator among accelerators 1752-0 to 1752-N can perform compression, form a packet with compressed content, and send the compressed content to compute device 1702 in the formed packet.

The following provides another example usage of compute device 1702 and accelerator cluster 1750. Packets received at compute device 1702 could be determined to be processed using encryption. The packets can be encapsulated in an encapsulating packet and sent to a particular accelerator among accelerators 1752-0 to 1752-N in accelerator cluster 1750 for encryption. The packet can include meta-data that includes an identifier of an encryption algorithm to use and a key to use (or a location of a key). An accelerator among accelerators 1752-0 to 1752-N can perform encryption, form a packet with encrypted content, and send the encrypted content to compute device 1702 in the formed packet.

Note that operations described with respect to compute device 1702 can also or alternatively be performed by or used by accelerator cluster 1750 and operations described with respect to accelerator cluster 1750 can also or alternatively be performed by or used by compute device 1702. For example, flow and state information can be conveyed to compute device 1702 for use in selecting an accelerator among accelerator 1704-0 to 1704-M.

Figure 18:
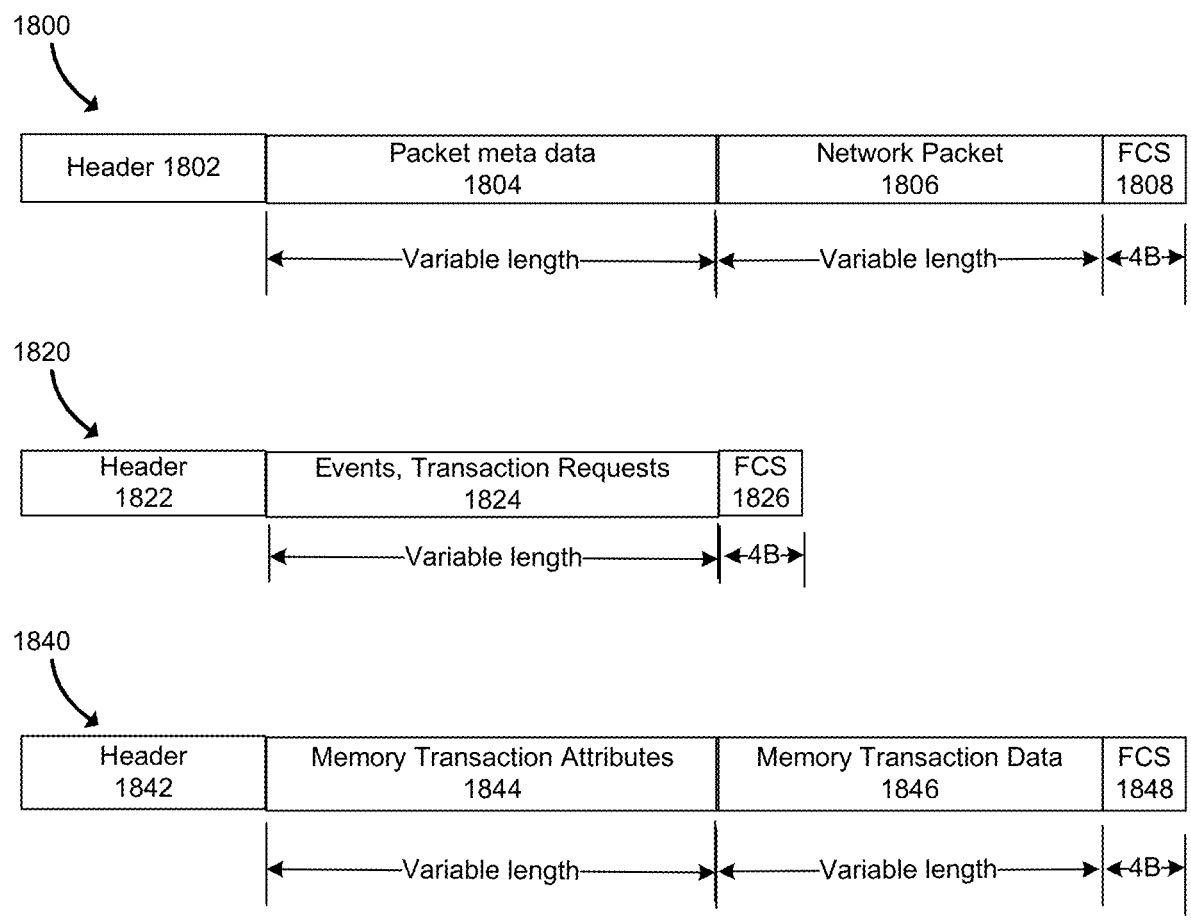
FIG. 18 depicts an example of packet formats.

FIG. 18 depicts an example of packet formats. For example, packets 1800, 1820, and 1840 can be used by a compute device or an accelerator device to communicate with another device and/or each other. Fields of any of packets 1800, 1820, and 1840 can be combined or removed and can be used as components of any other packet. Packet 1800 can encapsulate a received network packet 1806 (or portion thereof). Encapsulated packet 1806 can be a variable length. Header 1802 can be any format such as Ethernet, PCIe, Internet Protocol, and so forth. Header 1802 can convey one or more of: a MAC source address, MAC destination address, IP source address, IP destination address, VLAN tags, MPLS headers, and so forth. Packet meta data 1804 can be a variable length and indicate how the network packet was processed or how the network packet is to be processed by the receiver. For example, packet meta data 1804 can include quality of service (QoS) designation, encryption parameters (e.g., algorithm to use and key), accelerator selection (e.g., address), accelerator command (e.g., actions an accelerator is to perform), next accelerator selection (e.g., address of next accelerator to select), and so forth. An address of an accelerator can be an accelerator's MAC address or an index (e.g., 0, 1, 2, and so forth). Frame check sequence (FCS) 1808 can be used to indicate an end (termination) of a frame or packet and can include a cyclic redundancy check (CRC) code, although other codes can be used.

Packet 1820 can include and convey events or transaction requests. Header 1822 can be any format such as Ethernet, PCIe, Internet Protocol, and so forth. Header 1822 can convey one or more of: a MAC source address, MAC destination address, IP source address, IP destination address, VLAN tags, MPLS headers, and so forth. Events or transaction requests field 1824 can convey one or more of: memory transaction attributes, memory transaction data, packet scheduling events, correction event, PFC event, generic special event, marker event, table lookup (e.g., flow lookups), and so forth. The events or transaction requests field 1824 can be variable length. Frame check sequence (FCS) 1826 can be used to indicate an end (termination) of a frame or packet and can include a cyclic redundancy check (CRC) code, although other codes can be used.

Packet 1840 can include and convey memory transaction attributes and memory transaction data. For example, packet 1840 can be used in connection with a high bandwidth memory to store tables, state, or other information. An accelerator can request information from the high bandwidth memory. The high bandwidth memory can be secured with limited access by authorized accelerators. Header 1842 can be any format such as Ethernet, PCIe, Internet Protocol, and so forth. Header 1842 can convey one or more of: a MAC source address, MAC destination address, IP source address, IP destination address, VLAN tags, MPLS headers, and so forth. For example, memory transaction attributes 1844 can include memory transaction attributes such as requester identity (e.g., host identifier, virtual machine identifier), address, read command, or write command. Memory transaction data 1846 can include memory transaction data such as read data or data to be written. Frame check sequence (FCS) 1848 can be used to indicate an end (termination) of a frame or packet and can include a cyclic redundancy check (CRC) code, although other codes can be used.

Figure 19A:
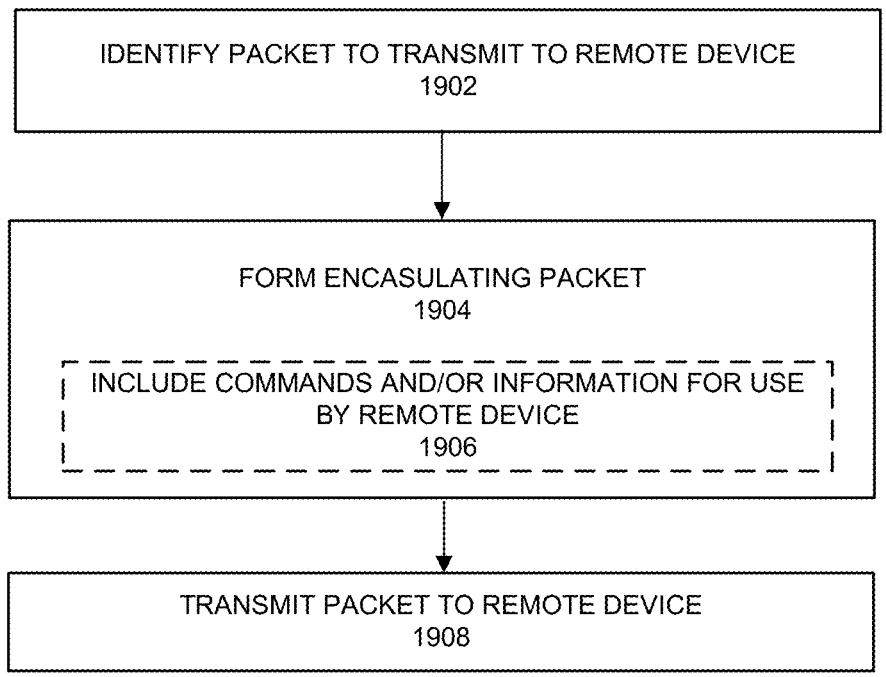
FIG. 19A depicts an example process.

FIG. 19A depicts an example process. The process can be used by any compute device or accelerator cluster, among others. At 1902, a packet can be identified to be transmitted to a remote device. A parser in an accelerator or a packet classifier in a network interface can determine an accelerator to use. For example, a remote accelerator device can be identified as being used to process a portion of a packet. For example, the remote accelerator device can perform any of: encryption, decryption, compression, de-compression, packet parsing, packet forwarding determination, RDMA, TCP header processing, table look-up (e.g., flow look-up), and so forth. In some examples, the remote device can include one or more remote accelerator devices.

At 1904, a portion of the packet can be encapsulated for transmission to the remote device. For example, an encapsulating packet can encapsulate the packet identified in 1902 or a portion of the packet. The encapsulating packet can be Ethernet compliant, or other formats. At 1906, a header or other portion of the encapsulating packet can be formed to include commands and/or information. For example, commands and/or information can include one or more of: packet flow, packet state, packet context, buffer level, specific accelerator or compute device to use, memory transaction attributes, memory transaction data, and so forth. A packet parser can provide flow, state and context information. An accelerator could provide its queue level or level of busyness. A header or payload can convey commands or information using one or more of: a MAC source address, MAC destination address, IP source address, IP destination address, VLAN tags, MPLS headers, meta data, and so forth. In some cases, instead of transmitting a portion of a packet, an encapsulating packet can include commands or information using a header or payload. For example, the commands and/or information can cause a remote device or compute device to perform a memory transaction, inform the remote device or compute device of an input or output buffer level, and other examples. At 1908, the formed packet is transmitted to the remote device or compute device.

Figure 19B:
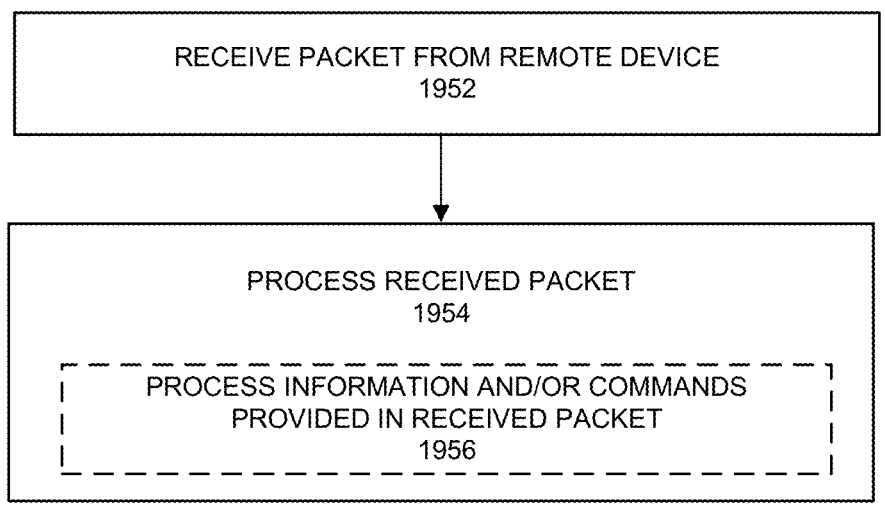
FIG. 19B depicts an example process.

FIG. 19B depicts an example process. The process can be used by any compute device or accelerator cluster, among others, to process received packets. At 1952, a packet is received from a remote device. For example, the remote device can be a compute device, accelerator cluster, accelerator sled, among other examples. At 1954, the packet can be processed. For example, the received packet can be processed to determine how to handle content of the packet. At 1956, information and/or commands provided in the received packet can be processed. For example, information such as accelerator selection, accelerator command, flow identifier, priority, buffer level, and so forth can be used to determine how to process content of the packet or to interact with the remote device. An interface could use the accelerator selection or flow identifier to select an accelerator. An accelerator could use a command to determine how to process content and a priority of processing (e.g., priority queue allocation) could be determined based on priority. A compute device could use the buffer level to determine whether or not to send requests to a particular accelerator or to reduce requests sent to a particular accelerator. For example, commands such as memory transaction, compression, de-compression, encryption, decryption, and so forth can be requested to be performed.

Various embodiments can include an apparatus, method, computer-readable medium, or system to receive flow or state information at a receiver device, determine (at the receiver device) an accelerator or compute device to perform processing based on the flow and/or state information to provide service level differentiation based on flow and/or state information.

Various embodiments provide for multiple Quality of Service (QoS) level queues to allocate packets for processing by a local accelerator device or remote accelerator device. In one example, a particular queue can be allocated for serving packets according to a particular QoS. Providing various levels of QoS can allow for prioritization of packet processing and can potentially reduce deadlock, provide traffic isolation, or packet priority management and reassignment. A network interface can receive a packet from a network medium. A packet classifier (e.g., flexible parsing unit) can determine a QoS level of the received packet based on one or more of: a header of the received packet, IP source address, IP destination address, MPLS tag, or VLAN tag. In some examples, packets from a particular port can be assigned to a particular QoS level.

The received packet is allocated to a QoS queue based on the determined QoS level. A particular QoS level can be provided a processing allocation for use to determine an amount of packets or bytes/second for processing using packets associated with the corresponding queue. For example, a highest QoS level can be allocated a highest allocation, a next highest QoS level can be allocated a next highest allocation level, and so forth.

In a case where packets (or a portion thereof) are to be transmitted to a remote device (e.g., accelerator cluster), a network interface can select packet(s) for transmission from a queue based on bandwidth allocation. For example, packets from a queue can be selected based on first-in-first-out selection for transmission using an allocated bandwidth. Queues can be selected according to a round robin scheme whereby packet(s) from the highest priority queue are selected first for transmission based on an allocated bandwidth, followed by selection of packet(s) from a next highest priority queue for transmission based on an allocated bandwidth, and so forth.

In a case where packets (or portions thereof) are to be processed by a local accelerator, the packet (or a pointer to the packet) can be transferred to the relevant local accelerator for processing. For example, packets allocated to a highest priority queue that are allocated for processing by the designated local accelerator A can be selected to be processed by local accelerator A. Next, packets allocated to a next highest priority queue that are allocated for processing by the designated local accelerator A can be selected to be processed by local accelerator A, and so forth.

In some cases, if packets assigned to a QoS level are allocated whereby some packets are to be processed by one or more local accelerators and other packets are to be processed by one or more remote accelerators, selection of packets can occur whereby packets for allocation to local accelerators are selected from queues by priority order and a selection of packets from queues for transmission can occur by priority order. Selection of packets for local accelerator processing and selection of packets for transmission to remote accelerators for processing can occur in parallel. In some cases, selection of packets for local processing or transmission for remote processing from a priority level queue can occur in series according to a first-in-first-out approach.

A remote accelerator cluster can perform processing on a packet and provide a response packet to the requester. For example, a remote accelerator can send a response packet that encapsulates the processed packet or sends a packet that includes a response to the request for processing by an accelerator. The response packet can be allocated into a queue associated with a QoS level specified by the response packet. According to some embodiments, the QoS level provided in the response packet can specify a QoS level. The specified QoS level can be different than which would be assigned to using a packet classifier at the receiver of the response packet, for example, and can override a designation by such packet classifier. However, in other cases, a priority level designation provided in a packet is not used and a receiver device determines a priority for processing the received packet.

Various embodiments provide for an accelerator to set a QoS level of a packet transmitted to another device. Accelerators could communicate to a remote device to override its normal determined QoS level and apply a specified QoS level, if permitted. A QoS level can be used to specify a queue to allocate to the response packet to specify a priority level of processing content of the packet. A packet classifier that receives a response packet can determine a same level of QoS for accelerator use requests and responses to accelerator use based on packet classification. Because the packet classifier does not know the urgency of processing a response packets and request packets, the packet classifier could classify the request as normal Ethernet traffic and give it a highest priority of 15. By contrast, a remote encryption accelerator could specify a QoS level of 15 (highest) for its response packets and a QoS level of 0 (lowest) for request packets, and the packet classifier could override its determined QoS levels for response packets and request packets and use the QoS levels sent by the remote accelerator in the response packets and request packets. Accordingly, a remote accelerator could help alleviate overuse of a queue associated with a QoS level or potentially reduce latency from a packet being associated with a lower QoS than is needed.

In some examples, a compute device can access and use local accelerators and can classify transactions from local accelerators into multiple QoS level queues to allow for traffic differentiation for flow control and different levels of quality of service. For example, an Ethernet link can allow for up to 8 traffic classes and various embodiments can allocate 8 traffic classes for carrying 8 different types of transactions such that a type of transaction can be flow controlled using an allocated queue.

Figure 20A:
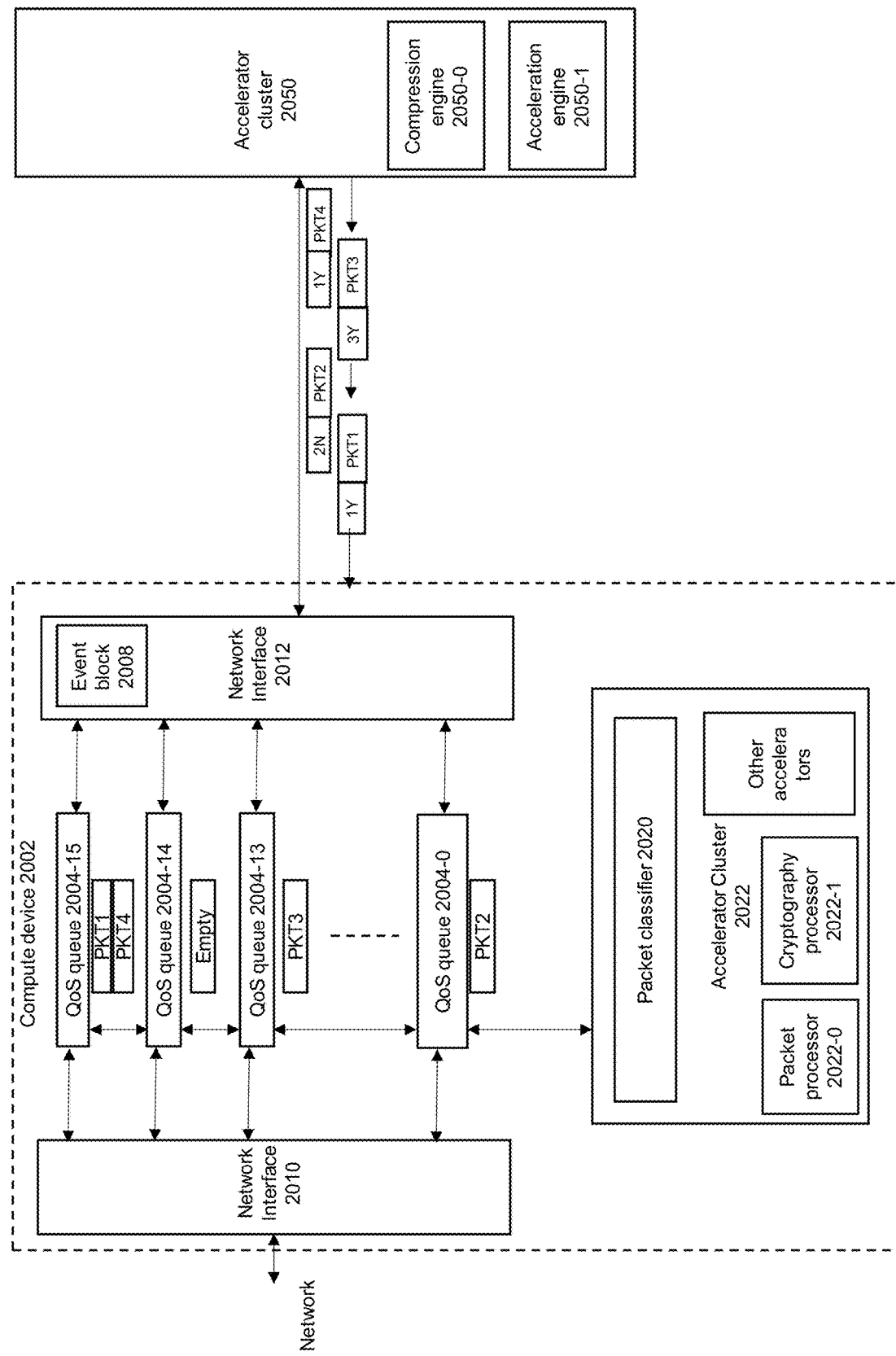
FIG. 20A depicts an example system that can be used to provide for allocation of packets to a particular quality of service.

FIG. 20A depicts an example system that can be used to provide for allocation of packets to a particular quality of service. The example shows a compute device 2002 in communication with an accelerator cluster 2050. In other examples, compute device 2002 can communicate with multiple other compute devices or accelerator clusters using network interface 2010 and 2012. Note that although network interfaces 2010 and 2012 are depicted as separate devices, they can be instead a single device. Network interfaces 2010 and 2012 can provide any type of interface including one or more of: network interface, interconnect (standardized or proprietary), serializer/deserializer (SERDES), and so forth.

Compute device 2002 can include or use multiple queues allocated for various quality of service. For example, a queue can be allocated in memory of compute device for a highest quality of service (level 15). In this example, a highest QoS level of 15 can be assigned a queue shown as QoS queue 2004-15. A next highest QoS level of 14 can be assigned a queue shown as 2004-14, and so forth. A default QoS queue can be for packets with no quality of service designation or determination. The default QoS queue can correspond to a lowest priority level (e.g., QoS level 0). Other number of QoS levels can be used. An accelerator can specify a priority level for processing a packet and a receiver interface can override or accept the priority level. Priority level can be placed in Ethernet packet traffic class, IP address, MAC address, VLAN tag, MPLS header, and so forth.

Priority levels can be assigned to packets based on designations received in the packets or based on processing of received packets. For example, packet classifier 2020 can determine a priority or QoS of a packet received from network interface 2010 or network interface 2012 based on processing of the packet. For example, processing can include inspecting one or more of: the source IP address, the destination IP address, source MAC address, destination MAC address, VLAN tag contents, MPLS header, metadata, and so forth. In some examples, event block 2008 can determine a priority of a packet received through network interface 2012 based on a specified priority in the received packet.

Any scheme can be used to determine priority level. For example, QoS levels can be distributed so that a flow or type of packet processing are not all assigned the same priority level but are distributed among priority levels. In some cases, different priority levels can be applied for ingress packets and different priority levels are applied for egress packets to reduce reuse of priority.

The following provides an example of use of accelerators in accelerator cluster 2022. Network interface 2010 receives a packet from a network medium. Packet classifier 2020 sets a QOS level 0 for the task of processing the received packet using local packet processor 2022-0 (e.g., first pass packet processing). The received packet and corresponding task are allocated to QoS queue 2004-0 for processing by packet processor 2022-0. Packet processor 2022-0 can process the packet(s) and then assign a QoS1 (e.g., QoS queue 2004-1) for processing the packet(s) next using a cryptography processor 2022-1 to decrypt certain parts of the packet (e.g., header). Cryptography processor 2022-1 can generate a decrypted portion of the packet and store the decrypted portion in memory. Cryptography processor 2022-1 can assign a QoS level 2 for a second processing by packet processor 2022-0 to process the decrypted header and accordingly assign the packet(s) to QoS queue 2004-2. Packet processor 2022-0 can process the decrypted header and allocate the packet(s) for processing by cryptography processor 2022-1 to decrypt remainder of the packets(s) at a QoS level 3. Cryptography processor 2022-1 can generate a decrypted remainder of packet and store the remainder into memory. Cryptography processor 2022-1 can assign a QoS level 4 using QoS queue 2004-4 for local packet processor 2022-0 (e.g., third pass packet processing) to process the entire packet(s). Packet processor 2022-0 can process the entire packet and make the packet(s) available for transfer to a host device using a host interface at a QoS level 5 using QoS queue 2004-5. Note that a priority level queue can store packets allocated for processing by one or more processors.

The following provides an example of use of accelerators in accelerator cluster 2022 and remote accelerator cluster 2050. Compute device 2002 can use accelerators in accelerator cluster 2022 and remote accelerator cluster 2050. Network interface 2010 receives a packet and sets a QOS level 0 for processing of the received packet by local packet processor 2022-0 (e.g., first pass packet processing). The received packet is allocated to QoS queue 2004-0 for processing by packet processor 2022-0. Packet processor 2022-0 can process the packet(s) and then assign the packet(s) to a QoS1 (e.g., QoS queue 2004-1) for processing next by a cryptography processor 2022-1 to decrypt certain parts of the packet, e.g., header. Cryptography processor 2022-1 can generate a decrypted portion of the packet and store the decrypted portion in memory. Cryptography processor 2022-1 can assign a QoS level 2 for a processing by packet processor 2022-0 to process the decrypted header and accordingly assign the packet and task to QoS queue 2004-2.

Packet processor 2022-0 can process the packet and determine remote compression provided by accelerator cluster 2050 is to be used. Packet processor 2022-0 can set a QoS level 6 and use QoS queue 2004-6 for transmission of the packet to accelerator cluster 2050. The packet allocated for remote compression can be encapsulated in an encapsulating packet and transmitted to accelerator cluster 2050. A priority level for the packet can be set in the encapsulating packet according to techniques described herein. For example, accelerator cluster 2050 can use a priority level scheme that is similar to that used by compute device 2002 and accelerator cluster 2050 can assign the encapsulated packet to a QoS queue having a priority level set by compute device 2002. In this example, the priority level of processing the encapsulated packet can be set to level 2 even though accelerator cluster 2050 would otherwise assign a priority level 4 based on the encapsulated packet type and packet properties. A QoS level 2 queue can be used to queue the content from the encapsulating packet. Accelerator cluster 2050 can select an accelerator to apply a compression to a portion of the packet provided in the encapsulating packet.

After compression of a portion of the packet provided in the encapsulating packet, accelerator cluster 2050 can transmit the compressed portion of the packet to compute device 2002 with an assigned priority level of 7 for processing by packet processor 2022-0, and the assigned priority level of 7 can override a priority level that would be set by compute device 2002. QoS queue 2004-7 can be used to queue the packet and task. Packet processor 2022-0 can process the compressed portion of the packet and make the packet(s) available for transfer to a host device using a host interface using a QoS level 8.

Accordingly, priority can be set for processing packets and tasks to potentially avoid one task blocking or being performed before another task to attempt to ensure delays are avoided for a higher priority task. A designated priority level can be set to distribute priority levels so that any priority level is not overloaded.

Figure 20B:
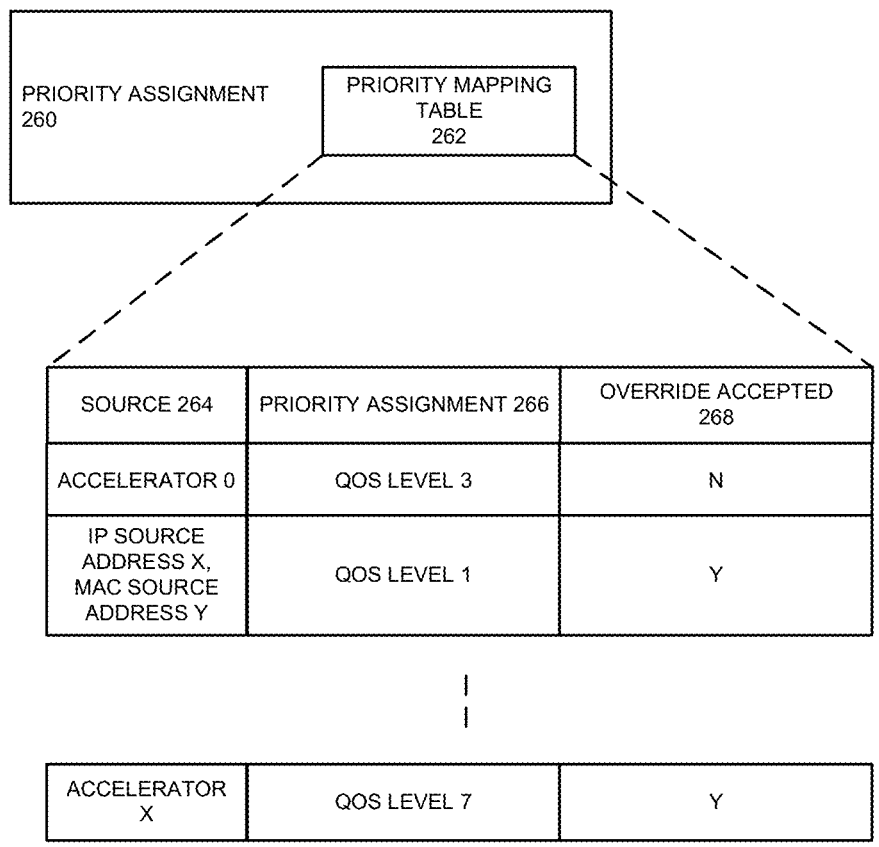
FIG. 20B depicts an example system to determine quality of service.

FIG. 20B depicts an example system to determine quality of service. For example, a priority assignment device 260 can be used to assign a priority to a packet for processing by an accelerator or to determine whether to accept a priority designation provided in a received packet or with a packet. A packet parser, packet classifier, event block, or other device can use priority assignment device 260. For example, priority assignment device 260 can access table 262 can include an identification of source device 264, priority assignment 266, and indication of whether an override of the priority assignment is accepted (e.g., override accepted 268). Source 264 can refer to an accelerator device by an accelerator index number where the accelerator device is on-chip, or connected via a local bus, fabric, or interconnect, or is off-chip and connected via a bus, fabric, interconnect, or network medium using network interfaces. Source 264 can refer to a remote device identified using one or more of: source IP address/port number, destination IP address/port number, source MAC address, destination MAC address, VLAN tag designation, MPLS header designation, meta-data content, and so forth. Priority assignment 266 can indicate a quality of service level for a source device. For example, a priority level can correspond to a priority level queue such as levels 0 to 15, although other ranges and schemes can be used. Override accepted 268 can indicate whether a priority designation included in a received packet, frame, or communication can override a level in priority assignment 266 for a particular source. An indication of override being accepted can be designated using a 1 bit value (e.g., 1 for yes (Y) and 0 for no (N)). Table 262 can be programmed or updated by an orchestrator or data center manager, among others. Accordingly, priority assignment device 260 can provide a priority designation for processing of a packet or content and for allocation to a priority level queue for subsequent processing.

Figure 21A:
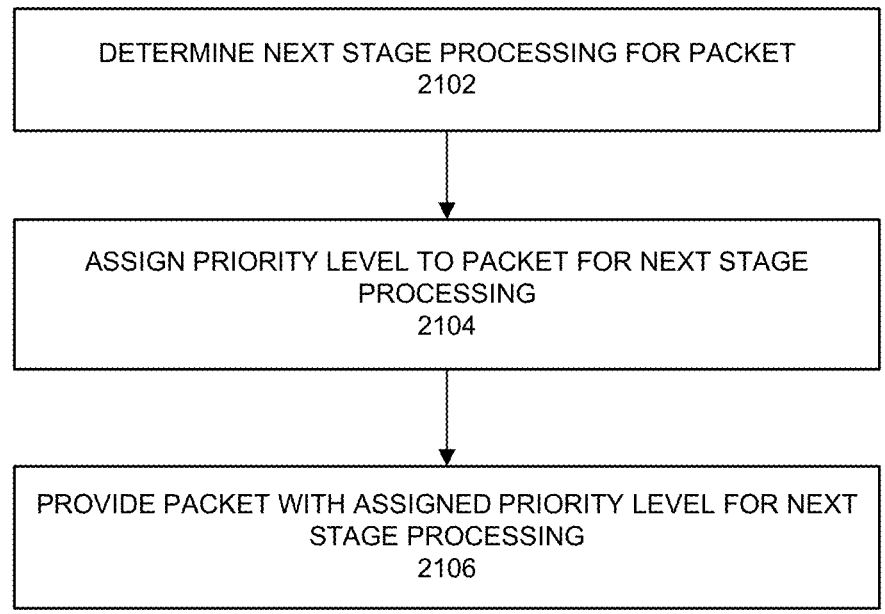
FIG. 21A depicts an example process.

FIG. 21A depicts an example process. The process can be applied by a compute device or remote accelerator that receives a packet and uses one or more compute resources to process the packet. The compute device or remote accelerator can include multiple queues to enqueue tasks and related data for processing according to a priority level. The process of FIG. 21A could be applied by the event block in an interface to process received packets or a packet classifier, among others.

At 2102, a determination can be made as to a next stage processing for a packet. For example, the determination can be made in connection with processing of a packet (e.g., by inspection of a header, VLAN tag, MPLS header, meta-data, or payload) so that after the processing of the packet, there is to be additional processing to be performed on the packet or information determined based on the processing of the packet. Next stage processing can be performed by a local device, accelerator, host device processor, remote accelerator, network interface, and so forth. For example, next stage processing can include one or more of: compression, decompression, encryption, decryption, packet processing, packet classification, next-destination look-up, RDMA, providing to a host device, and so forth. A packet parser, accelerator, event block or other device or process can determine a next accelerator to process packet or destination of packet. Packet processing paths can be predefined or configurable. An example processing path includes: parsing a received packet, decrypting a packet, parsing decrypted portions of the packet, and providing the packet to a host. Many other processing paths can be specified including whether a local or remote accelerator is to be used.

At 2104, a priority level can be assigned to the packet for next stage processing. For example, a priority level can be selected based on customer choice or pre-defined levels.

At 2106, the packet can be provided with the assigned priority level for the next stage processing. For example, the packet can be allocated for processing by a remote accelerator and the packet can be encapsulated in another packet and transmitted to the remote accelerator. A priority level can be provided with the encapsulating packet so that the remote accelerator can allocate the packet and task to a queue associated with the priority level. In a case where the next stage processing is to performed using a local accelerator or compute element, the packet (or content derived or determined therefrom) can be provided for allocation to a queue associated with a priority level selected for the next stage processing of the packet. The selected next stage processing can draw packets and associated tasks from queues based on associated priority. For example, a next stage processing element can select packets allocated for processing by the next stage processing element from a highest priority queue, followed by a next highest priority queue, and so forth. In a more specific example, a next stage processing element can select packets that are marked for compression in a first-in-first-out manner from a highest priority queue, followed by a next highest priority queue, and so forth.

Figure 21B:
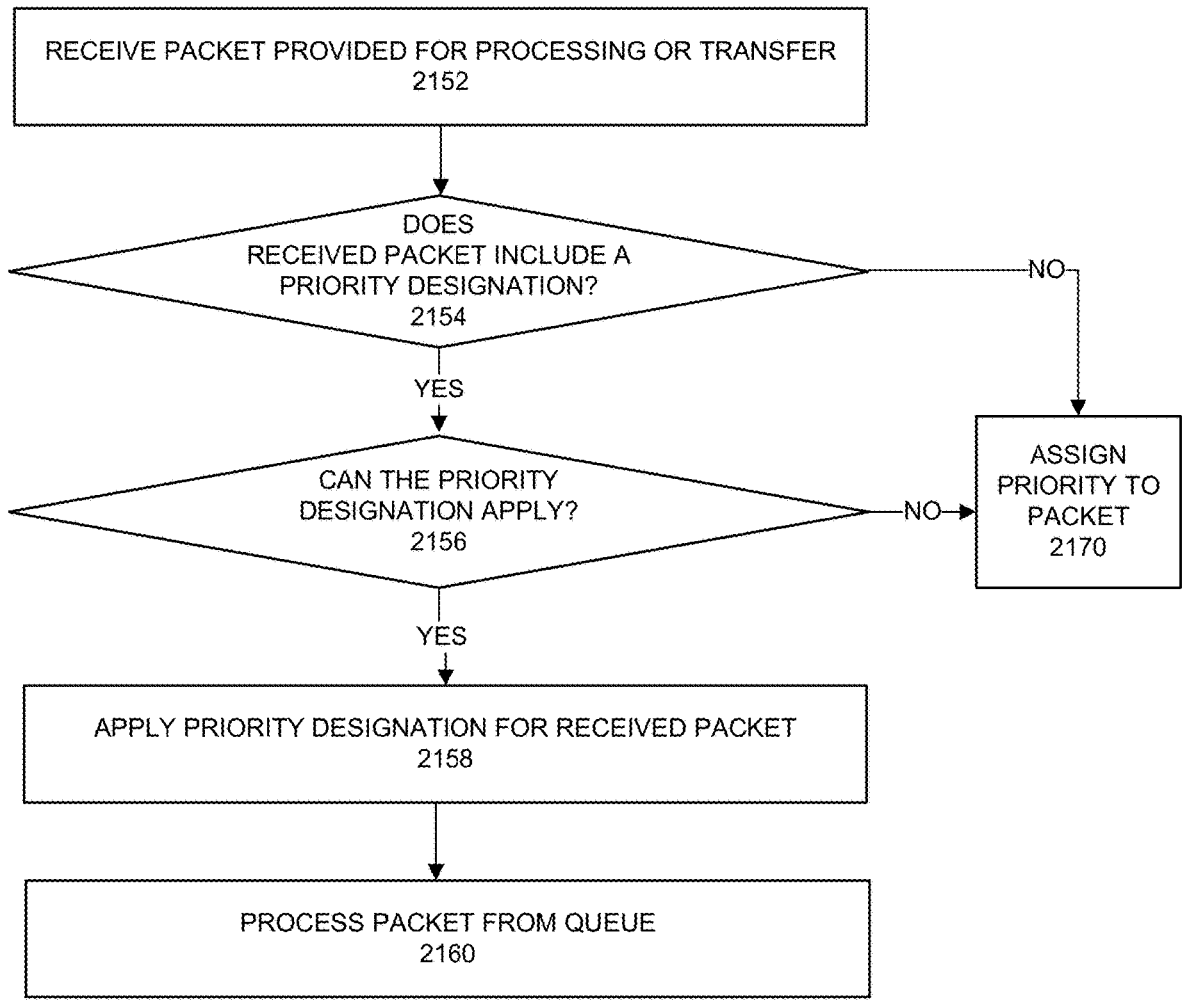
FIG. 21B depicts an example process.

FIG. 21B depicts an example process. The process can be applied by a compute device or remote accelerator that receives a packet and uses one or more compute resources to process the packet, among other devices. The compute device or remote accelerator can include multiple queues to enqueue tasks and related data for processing according to a priority level. The process of FIG. 21B could be applied by the event block in an interface for example or a packet classifier, among others. At 2152, a packet can be received that has been provided for processing or transfer to another device. For example, the packet can be provided by a local accelerator device or compute resource or provided using a network from a remote accelerator device or compute resource. At 2154, a determination is made as to whether the received packet includes a priority designation. If a received packet includes a priority designation, then 2156 can follow. If a received packet does not include a priority designation, then 2170 can follow.

At 2156, a determination is made as to whether to apply a priority designation in a received packet. For example, pre-defined or configurable rules can be used to determine whether to apply a priority designation based at least on a source of the packet. For example, priority designation from a decrypter can be accepted or a priority designation from a decompression engine can be accepted. However, a priority designation from an Ethernet port parser may not be accepted because the priority could be based on content that was not decrypted or decoded. If a priority designation can apply, then 2158 can follow. If a priority designation cannot apply, then 2170 can follow.

At 2158, a priority designation can be applied for the received packet or data to be processed. For example, the packet can be allocated to a queue based on a priority designation in the received packet. A priority level that would have otherwise been determined by a receiver (e.g., packet parser, event block, or other device) can be overridden using the received priority designation.

At 2170, a priority level can be assigned to the received packet. The priority level can be set according to predefined schemes or configurable schemes based on processing (e.g., hash) of contents of the packet including header, payload, VLAN tag content, MPLS header, meta-data or other content.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

What is claimed is:

1. A method comprising:
providing to a target device, from an interface, a request to a plurality of accelerators for processing of a portion of a first packet using a first accelerator of the plurality of accelerators;
receiving in at least a second packet, at the interface, a response to the request for processing, the response including packet flow state from the first accelerator generated by processing the portion of the first packet, wherein the response is based on the processing of the portion of the first packet by the first accelerator and wherein the second packet comprises an Ethernet packet;
selecting a second accelerator from among a second plurality of accelerators based on the packet flow state from the first accelerator, wherein the plurality of accelerators are coupled to the target device and second plurality of accelerators are connected to the interface; and
providing, at the interface, to the selected second accelerator, the packet flow state from the first accelerator for processing the response by the selected second accelerator.

2. The method of claim 1, wherein the providing, at the interface, the packet flow state from the first accelerator for processing the response by the selected second accelerator comprises selecting the second accelerator to process packets associated with a same flow.

3. The method of claim 1, comprising:
receiving, at the interface, a queue level associated with the first accelerator and
adjusting packets, at the interface, sent for processing by the first accelerator based on the queue level.

4. The method of claim 1, comprising:
providing, from the interface, to the first accelerator in at least one packet one or more of: the packet flow state or accelerator state information.

5. The method of claim 1, wherein
the first accelerator comprises one or more of: a processor, a graphics processing unit, a storage device, a memory device, a programmable control logic, a field programmable gate array (FPGA), an artificial intelligence inference device, an image processing device, a hardware-executed processes, an encryption device, a decryption device, a compression device, a de-compression device, a packet parser, a packet forwarding determiner, a remote direct memory access engine, a transmission control protocol (TCP) header processor, or a flow look-up device and
the second accelerator comprises one or more of: a processor, a graphics processing unit, a storage device, a memory device, a programmable control logic, an FPGA, an artificial intelligence inference device, an image processing device, a hardware-executed processes, an encryption device, a decryption device, a compression device, a de-compression device, a packet parser, a packet forwarding determiner, a remote direct memory access engine, a TCP header processor, or a flow look-up device.

6. The method of claim 1, wherein:
the first accelerator is to perform one or more of: encryption, decryption, compression, de-compression, packet parsing, packet forwarding determination, RDMA, TCP header processing, or table look-up and
the second accelerator is to perform one or more of: matrix multiplication, image processing, encryption, or decryption.

7. An apparatus comprising:
an interface;
a memory to store instructions thereon; and
at least one processor, coupled to the interface, wherein based on execution of the instructions, the at least one processor is to:
provide a request to a target device coupled to a plurality of accelerators to process a portion of a first packet using a first accelerator of the plurality of accelerator;
receive a response to the request in at least a second packet for processing, the response including packet flow state from the first accelerator generated by processing the portion of the first packet, wherein the response is based on the processing of the portion of the first packet and wherein the second packet comprises an Ethernet packet; and
select a second accelerator from among a second plurality of accelerators based on the packet flow state from the first accelerator, wherein the plurality of accelerators are coupled to the target device and second plurality of accelerators are connected to the at least one processor;
assign, to the selected second accelerator, the packet flow state from the first accelerator for processing the response by the selected second accelerator.

8. The apparatus of claim 7, wherein based on execution of the instructions, the at least one processor is to:
receive a flow identifier and state with the response and
select the second accelerator based, at least in part, on the flow identifier and state.

9. The apparatus of claim 7, wherein based on execution of the instructions, the at least one processor is to:
receive a queue level associated with the first accelerator and
adjust packets sent for processing by the first accelerator based on the queue level.

10. The apparatus of claim 7, wherein based on execution of the instructions, the at least one processor is to:
provide to the first accelerator in at least one packet one or more of: the packet flow state or accelerator state information.

11. The apparatus of claim 7, wherein
the first accelerator comprises one or more of: a processor, a graphics processing unit, a storage device, a memory device, a programmable control logic, a field programmable gate array (FPGA), an artificial intelligence inference device, an image processing device, a hardware-executed processes, an encryption device, a decryption device, a compression device, a de-compression device, a packet parser, a packet forwarding determiner, a remote direct memory access engine, a transmission control protocol (TCP) header processor, or a flow look-up device and
the second accelerator comprises one or more of: a processor, a graphics processing unit, a storage device, a memory device, a programmable control logic, a field programmable gate array (FPGA), an artificial intelligence inference device, an image processing device, a hardware-executed processes, an encryption device, a decryption device, a compression device, a de-compression device, a packet parser, a packet forwarding determiner, a remote direct memory access engine, a transmission control protocol (TCP) header processor, or a flow look-up device.

12. At least one non-transitory computer-readable medium, comprising instructions stored thereon, that if executed by one or more processors, cause the one or more processors to:
cause transmission of a request to a target device coupled to a plurality of accelerators for processing of a portion of a first packet using a first accelerator of the plurality of accelerators;
receive a response to the request in at least a second packet for processing, the response including packet flow state from the first accelerator generated by processing the portion of the first packet, wherein the response is based on the processing of the portion of the first packet by the first accelerator and wherein the second packet comprises an Ethernet packet;
select a second accelerator from among a second plurality of accelerators based on the packet flow state from the first accelerator, wherein the second plurality of accelerators are connected to the one or more processors; and
assign, to the selected second accelerator, the packet flow state from the first accelerator for processing the response by the selected second accelerator.

13. The non-transitory computer-readable medium of claim 12, comprising instructions stored thereon, that if executed by one or more processors, cause the one or more processors to:
receive a flow identifier and state with the response and select the second accelerator based, at least in part, on the flow identifier and state.

14. The non-transitory computer-readable medium of claim 12, comprising instructions stored thereon, that if executed by one or more processors, cause the one or more processors to:
receive a queue level associated with the first accelerator and
adjust packets sent for processing by the first accelerator based on the queue level.

15. The non-transitory computer-readable medium of claim 12, comprising instructions stored thereon, that if executed by one or more processors, cause the one or more processors to:
provide to the first accelerator in at least one packet one or more of: the packet flow state or accelerator state information.

16. The non-transitory computer-readable medium of claim 12, where:
the first accelerator comprises one or more of: a processor, a graphics processing unit, a storage device, a memory device, a programmable control logic, a field programmable gate array (FPGA), an artificial intelligence inference device, an image processing device, a hardware-executed processes, an encryption device, a decryption device, a compression device, a de-compression device, a packet parser, a packet forwarding determiner, a remote direct memory access engine, a transmission control protocol (TCP) header processor, or a flow look-up device and
the second accelerator comprises one or more of: a processor, a graphics processing unit, a storage device, a memory device, a programmable control logic, a field programmable gate array (FPGA), an artificial intelligence inference device, an image processing device, a hardware-executed processes, an encryption device, a decryption device, a compression device, a de-compression device, a packet parser, a packet forwarding determiner, a remote direct memory access engine, a transmission control protocol (TCP) header processor, or a flow look-up device.

17. An apparatus comprising:
a network interface device comprising:
circuitry to transmit a portion of a payload of a first packet to a plurality of accelerators to process a portion of the payload of a first packet and
circuitry to;
receive processed data and state data in at least a second packet from a first accelerator of the plurality of accelerators, wherein the state data comprises packet flow state data generated from processing of the portion of the payload of the first packet by the first accelerator of the plurality of accelerators and wherein the second packet comprises an Ethernet packet and
based on a configuration, select a second accelerator from among a second plurality of accelerators based on the packet flow state data from the first accelerator and provide the processed data and the packet flow state data to the second accelerator to process the received processed data based on the processed data and the packet flow state data, wherein the selected second accelerator comprises a field programmable gate array (FPGA) or graphics processing unit (GPU).

18. The apparatus of claim 17, wherein the state data comprises one or more of: sequence information, connection information, or connection identifier.

19. The apparatus of claim 17, wherein the state data comprises one or more of: destination port or destination IP address.

20. The apparatus of claim 17, wherein the state data comprises one or more of: MAC context information, internet protocol (IP) context information, transmission control protocol (TCP) context information, or application context information.

* * * * *